United States Patent
Grant et al.

(10) Patent No.: US 11,637,666 B2
(45) Date of Patent: Apr. 25, 2023

(54) UNIFIED UL AND DL BEAM INDICATION

(71) Applicant: Telefonaktiebolaget LM Ericsson (publ), Stockholm (SE)

(72) Inventors: Stephen Grant, Pleasanton, CA (US); Sebastian Faxér, Järfälla (SE); Mattias Frenne, Uppsala (SE); Andreas Nilsson, Gothenburg (SE); Ravikiran Nory, San José, CA (US); Niklas Wernersson, Kungsängen (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 134 days.

(21) Appl. No.: 16/646,052

(22) PCT Filed: Sep. 10, 2018

(86) PCT No.: PCT/IB2018/056888
§ 371 (c)(1),
(2) Date: Mar. 10, 2020

(87) PCT Pub. No.: WO2019/049096
PCT Pub. Date: Mar. 14, 2019

(65) Prior Publication Data
US 2020/0280409 A1 Sep. 3, 2020

Related U.S. Application Data

(60) Provisional application No. 62/556,940, filed on Sep. 11, 2017.

(51) Int. Cl.
*H04L 5/00* (2006.01)
*H04W 72/04* (2023.01)

(52) U.S. Cl.
CPC .......... *H04L 5/0048* (2013.01); *H04L 5/0044* (2013.01); *H04W 72/042* (2013.01)

(58) Field of Classification Search
CPC ................ H04B 7/0617; H04B 7/0697; H04L 5/0023; H04L 5/0044; H04L 5/0048; H04L 5/0091; H04W 72/042
See application file for complete search history.

(56) References Cited

U.S. PATENT DOCUMENTS 10,237,879 B2  3/2019 Kim et al.
2015/0249972 A1  9/2015 You et al.
(Continued)

FOREIGN PATENT DOCUMENTS

CN 104885391 A 9/2015
CN 105359569 A 2/2016
(Continued)

OTHER PUBLICATIONS

International Search Report and Written Opinion dated Dec. 19, 2018 issued in International Application No. PCT/IB2018/056888. (14 pages).
Huawei et al., "Beam measurement and reporting", 3GPP TSG RAN WG1 Meeting NR#3; R1-1715467; Nagoya, Japan, Sep. 18-21, 2017. (9 pages).
(Continued)

*Primary Examiner* — Mansour Oveissi
(74) *Attorney, Agent, or Firm* — Rothwell, Figg, Ernst & Manbeck, P.C.

(57) ABSTRACT

A user equipment (UE) the UE being configured to receive a message comprising configuration information, CI, indicating that a reference signal, RS, is quasi-co-located, QCL, with a transmission; and adjust a spatial Tx configuration for the transmission based on an RS associated with the received CI.

15 Claims, 12 Drawing Sheets

(56) References Cited

U.S. PATENT DOCUMENTS

| | | | |
|---|---|---|---|
| 2017/0171842 A1 | 6/2017 | You et al. | |
| 2017/0273128 A1* | 9/2017 | Abedini | H04L 1/00 |
| 2018/0042028 A1* | 2/2018 | Nam | H04W 72/082 |
| 2018/0234959 A1* | 8/2018 | Ahn | H04W 72/046 |
| 2019/0021079 A1* | 1/2019 | Stirling-Gallacher | H04B 7/0695 |
| 2019/0387440 A1* | 12/2019 | Yiu | H04W 36/165 |

FOREIGN PATENT DOCUMENTS

| | | |
|---|---|---|
| IN | 201627000753 A | 7/2016 |
| WO | 2018/172994 A1 | 9/2018 |
| WO | 2019/032020 A1 | 2/2019 |

OTHER PUBLICATIONS

Ericsson, "DL beam indication for periodic and aperiodic reference signals", 3GPP TSG-RAN WG1 #90; R1-1714291 Prague, Czech Republic, Aug. 21-25, 2017. (7 pages).

Nokia et al., "Summary of offline QCL discussion", 3GPP TSG RAN WG1 #90; R1-1715293; Prague, Czech Republic, Aug. 21-25, 2017. (3 pages).

Huawei et al., "Beam indication for control and data channels", 3GPP TSG RAN WG1 Meeting #90; R1-1712222 Prague, Czech Republic, Aug. 21-25, 2017. (7 pages).

LG Electronics, "Discussion on UL beam management", 3GPP Tsg Ran WG1 Meeting #90; R1-1713150 Prague, Czech Republic, Aug. 21-25, 2017. (5 pages).

Xiao, H., et al., "Massive MIMO," Massive MIMO Technology, Standard Progress and Development, Feb. 6, 2017 (4 pages).

* cited by examiner

UNIFIED UL AND DL BEAM INDICATION

CROSS REFERENCE TO RELATED APPLICATION(S)

This application is a 35 U.S.C. § 371 National Stage of International Patent Application No. PCT/IB2018/056888, filed Sep. 10, 2018, designating the United States and claiming priority to U.S. provisional application No. 62/556,940, filed on Sep. 11, 2017. The above identified applications are incorporated by reference.

TECHNICAL FIELD

Disclosed are embodiments for beam indication.

BACKGROUND

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

In the 3GPP TSG RAN WG1 #90 Meeting (21-25 Aug. 2017) the following agreement #1 was made related to beam indication for the downlink (DL) data channel PDSCH:

TABLE 1

Agreement #1

For the purposes of beam indication for at least NR unicast PDSCH, support an N-bit indicator field in DCI which provides a reference to a DL RS which is spatially QCL'd with at least one PDSCH DMRS port group
    An indicator state is associated with at least one index of a
    DL RS (e.g., CRT, SSB Index) where each index of downlink RS
    can be associated with a given DL RS type, e.g., aperiodic
    CSI-RS, periodic CSI-RS, semi-persistent CSI-RS, or SSB,
        Note: L1-RSRP reporting on SSB is not yet agreed
        Note: One possibility to determine DL CSI-RS type is through
        the resource setting ID, other options are not precluded
    The value of N is FFS, but is at most [3] bits
    FFS: The case of more than one DMRS port group
    FFS: Whether or not to indicate more than one beam indicator,
    NR strive to minimize the indicator overhead
FFS: Signalling mechanism for the association of a DL RS index
(e.g., CRI, SSB index) to an indicator state, e.g.,
    The association is explicitly signaled to the UE
    The association is implicitly determined by the UE
    Combination of the above is not precluded
FFS: An indicator state may or may not also include other
parameter(s), e.g., for PDSCH to RE mapping purposes analogous
to PQI in LTE, other QCL parameters
FFS: Whether or not an indicator state may be associated
with more than one DL RS index
FFS: PDCCH beam indication may or may not be based on the
beam indication states for PDSCH This agreement establishes that an N-bit indicator field in DCI provides at least a spatial QCL reference to a downlink reference signal (DL RS) (either CSI-RS or SSB) to aid in the demodulation of PDSCH. A given value of the indicator is referred to as an indicator state, and it is associated with an index of the DL RS (CRI or SSB Index). In this case of CSI-RS, the resource can be periodic, semi-persistent, or aperiodic. In this agreement, it is for further study (FFS) how the DL RS index is associated with the indicator state, either through explicit signalling from the gNB to UE or implicitly determined by the UE during measurement.

In the same 3GPP meeting, the agreed N-bit indicator field was extended for further supporting downlink scheduling operation as follows:

TABLE 2

Agreement #2

Support the QCL indication of DM-RS for PDSCH via DCI signaling:
    The N-bit indicator field in the agreed WF R1-1714885 is extended to
    support:
        Each state refers to one or two RS sets, which indicates a QCL
        relationship for one or two DMRS port group (s), respectively
            Each RS set refers to one or more RS(s) which are
            QCLed with DM-RS ports within corresponding DM-
            RS group
            Note: The RSs within a RS set may be of different types
            If there are more than one RS per RS set, each of them
            may be associated with different QCL parameters, e.g.
            one RS may be associated with spatial QCL while
            another RS may be associated with other QCL
            parameters, etc
            Configuration of RS set for each state can be done via
            higher layer signaling
                E.g., RRC/RRC + MAC CE
    FFS the timing when the QCL is applied relative to the time of the
    QCL indication With this extension, each indicator state is associated with one or two RS sets, where each RS set refers to one or two downlink DMRS port groups, respectively. This facilitates QCL indication in the case of that multi-TRP operation (DL CoMP) is configured. Different states may correspond to different TRP pairs supporting, e.g., non-coherent joint transmission (NC-JT) from a pair of TRPs to the UE. Indicator states configured with only a single RS set may be used to support QCL indication either in the case of basic single-TRP operation or in the case of multi-TRP operation with, e.g., dynamic point selection (DPS).

In any case, an RS set contains one or more DL RSs. In the case of a single DL RS, a set contains an index to either a CSI-RS or SSB. In the case of more than one DL RS, a set could contain, for example, an index to either CSI-RS or SSB and a configured TRS. In this case, the PDSCH DMRS could be configured to be QCL with CSI-RS/SSB with respect to spatial parameters, but QCL with TRS with respect to non-spatial (time/frequency) parameters.

SUMMARY

Throughout this disclosure the following generic name for the N-bit indicator is used: Transmission Configuration Indicator (TCI). According to some embodiments, this N-bit indicator may be functionally identical to the QCL Reference Indicator (QRI) disclosed in U.S. provisional patent application No. 62/544,534, filed on Aug. 11, 2017.

TABLE 3 (below) shows an exemplary set of TCI states that may be RRC configured to a UE. With N-bits, up to $2^N$ TCI states may be defined, since only one set can be selected at a time, some containing a single RS set and others containing multiple RS sets to support multi-TRP operation. In the case of basic single TRP operation, all TCI states would contain only a single RS set. A default TCI state is also shown which may be used, for example, for QCL indication referring to the SSB beam index determined by the UE during initial access. As agreed previously, different TCI states may be used for QCL indication referring to different RS types, i.e., SSB, periodic, semi-persistent, or aperiodic CSI-RS. It is up to the network implementation to configure the states depending on what mix of DL RSs are used for beam management.

TABLE 3

TCI states used for QCL indication for PDSCH and PDCCH

| TCI State | RS Set(s) | Used for PDCCH QCL Indication | Used for PDSCH QCL Indication |
|---|---|---|---|
| 0 (default state) | {Set1$_0$} | Y | Y |
| 1 | {Set1$_0$} | Y | Y |
| 2 | {Set1$_0$} | Y | Y |
| 3 | {Set1$_3$, Set2$_3$} | | Y |
| . | . | . | . |
| . | . | . | . |
| . | . | . | . |
| $2^N$–1 | {Set1$_{2^N-1}$, Set2$_{2^N-1}$} | | Y |

One of the FFS items in Agreement #1 above is regarding whether or not QCL indication for PDCCH may be based on the beam indication states for PDSCH. This disclosure proposes to unify the QCL indication functionality for PDSCH and PDCCH as much as possible.

There currently exist certain challenge(s).

One problem is that the gNB needs to set its analog receive (Rx) beam in advance of receiving UL signals (PUSCH, PUCCH, SRS) transmitted from the UE. To keep UL beam management under the control of the gNB (agreed in 3GPP), a method is needed to control the direction(s) in which the UE transmits UL signals such that the received signal(s) at the gNB align with a desired gNB Rx beam direction.

Another problem is that in some cases a UE may not have beam correspondence capability, meaning that is not sufficiently well calibrated in order to control its Tx beamforming direction for transmitting an UL signal such that it aligns with the Rx beamforming direction for receiving a DL signal. In this case, a method is needed for the gNB to effectively control the direction(s) in which the UE transmits the PUSCH, PUCCH, and SRS such that the received signal(s) at the gNB align with a desired gNB Rx beam direction.

A further problem is that there is no known way to perform DL beam management (selection of DL beams) based on UL RS, such as SRS. This could be beneficial in a system that is mostly based on channel reciprocity.

Certain aspects of the present disclosure and their embodiments may provide solutions to these or other challenges.

Some embodiments of this disclosure extend the DL beam indication approach in U.S. application No. 62/544,534 such that UL beam indication may be included in the same framework (unified DL and UL beam indication) and may further solve one or more problems identified above. One step to achieve such objectives is to allow UL RS as well as DL RS in a TCI state.

For example, the gNB signals the UE with a particular TCI, which is used at the UE for the purposes of setting the UE's beamforming weights (analog or digital) for the transmission of UL signals (PUSCH, PUSCH, SRS). The benefit of this is that the received signals at the gNB align with the desired gNB analog Rx beam directions which simplify gNB receiver processing.

For the case of UEs with beam correspondence and UL scheduling, the UE makes use of the one or more DL RSs (e.g., CSI-RS, SSB) that are associated with the signalled TCI in order to adjust its Tx beamforming weights for transmitting one or more of PUSCH, PUCCH, or SRS. Because the UE has performed a measurement on the one or more DL RSs at a prior point in time, it is aware of appropriate Rx beamforming weights associated with each DL RS. The UE then adjusts its Tx beamforming weights such that they are reciprocal to the Rx beamforming weights. Reciprocal can mean, for example, that the resulting Tx beam(s) are aligned with the Rx beam(s) or that reciprocal spatial QCL holds between the DL RS received at the UE and the transmitted UL RS from the UE.

For the case of UEs without beam correspondence and UL scheduling, the UE makes use of one or more UL RSs (e.g., SRS) that are associated with the signalled TCI in order to adjust its Tx beamforming weights. In one embodiment, the gNB has performed a measurement on a plurality of SRS resources at a prior point in time, where each SRS resource is associated with a different UE Tx beam. Based on these measurements, the gNB indicates to the UE one or more preferred SRS resources, e.g., through signalling of one or more SRS resource indicators (SRIs) that the UE should associate with one or more TCI states. Because the UE is aware of the Tx beamforming weights for each SRS that is already associated with the TCI signalled in the beam indication message, the UE then uses the same or similar Tx beamforming weights for the transmission of one or more of PUSCH, PUCCH, and SRS.

For the case of UEs with beam correspondence and DL scheduling, the gNB makes use of one or more UL RSs (e.g., SRS) transmitted by the UE that are associated with the signalled TCI in order to adjust its gNB Tx beamforming weights. In one embodiment, the gNB has performed a measurement on a plurality of SRS resources at a prior point in time, where each SRS resource is associated with a different UE Tx beam. Based on these measurements, the gNB indicates to the UE one or more preferred SRS resources, e.g., through signalling of one or more SRS resource indicators (SRIs) that the UE should associate with one or more TCI states. Assuming UL/DL correspondence exists at the gNB side, the gNB adjusts its Tx beamforming weights such that they are reciprocal to the gNB Rx beamforming weights used to receive each SRS that is already associated with the signalled TCI. Furthermore, because the UE is aware of the UE Tx beamforming weights for each SRS that is already associated with the TCI signalled in the beam indication message, the UE then adjusts its Rx beamforming weights such that they are reciprocal to the Tx beamforming weights for the reception of one or more of PDSCH, PDCCH. SSB, TRS, PTRS or CSI-RS.

In Summary:

The UE adjusts its spatial Tx configuration for the transmission of UL signals, e.g., PUSCH, PUCCH, SRS, based on RSs that are associated with a TCI that is signaled to the UE;

The UE adjusts its spatial Rx configuration for the reception of DL signals, e.g., PDSCH, PDCCH, SSB or CSI-RS, based on previous transmission of UL RSs (e.g. SRS) that are associated with a TCI that is signaled to the UE;

TCI can be signaled in DCI containing an UL grant scheduling a PUSCH transmission; and The RSs in a RS Set contained in a TCI state may contain UL RSs (e.g., SRS) in addition to DL RSs (e.g., CSI-RS, SSB).

There are, proposed herein, various embodiments which address one or more of the issues disclosed herein.

For example, in one aspect there is provided a UE being configured to receive a message comprising configuration information, CI, indicating that a reference signal, RS, is quasi-co-located, QCL, with a transmission, and adjust a spatial Tx configuration for the transmission based on an RS associated with the received CI.

In some embodiments, the message is a layer 2 message, MAC-CE message, RRC message, or DCI message.

In some embodiments, the message is a DCI message and the DCI message comprises the CI and one of: an UL grant scheduling a PUSCH and a DL grant scheduling a PDSCH.

In some embodiments, the RS associated with the received CI is the RS indicated by the received CI.

In some embodiments, the RS associated with the received CI is one of a DL RS and an UL RS.

In some embodiments, one or more RS sets are associated with the CI, and the RS associated with the CI is in at least one of the RS sets associated with the CI.

In some embodiments, the CI comprises a Transmission Configuration Indicator, TCI, and the RS set(s) are associated with the TCI.

In some embodiments, the UE is configured to adjust the spatial Tx configuration such that the spatial configuration is reciprocal to a spatial configuration associated with the RS that is associated with the received CI.

In some embodiments, the RS associated with the received CI is a DL RS, and the UE is configured to adjust the spatial Tx configuration such that it is reciprocal to a spatial Rx configuration associated with the DL RS.

In some embodiments, the RS associated with the received CI is an UL RS included in an RS set associated with the CI, and the UE is configured to adjust the spatial Tx configuration such that it is reciprocal to a second spatial Tx configuration associated with the UL RS.

In some embodiments, the transmission is a PUSCH, PUCCH, or SRS transmission.

In some embodiments, the received CI is associated with i) a first RS set containing a first RS and ii) a second RS set containing a second RS, the UE adjusts a first spatial Tx configuration based on the first RS, the UE adjusts a second spatial Tx configuration based on the second RS, the UE uses the first spatial Tx configuration for transmission of PUCCH, and the UE uses the second spatial Tx configuration for transmission of PUSCH.

In another aspect, the UE is operable to receive the CI and adjust a spatial receive, Rx, configuration based on an RS associated with the received CI, wherein one or more RS sets are associated with the CI, and the RS associated with the CI is included in at least one of the RS sets associated with the CI.

In some embodiments, the message is a DCI message and the received DCI further comprises a DL grant scheduling a PDSCH.

In some embodiments, the CI comprises a Transmission Configuration Indicator, TCI, and the RS sets are associated with the TCI.

In some embodiments, the RS associated with the CI is an UL RS included in an RS set associated with the CI, and the UE is configured to adjust the spatial Rx configuration such that the spatial Rx configuration is reciprocal to a spatial Tx configuration associated with the UL RS.

In some embodiments, the UE is configured to use the adjusted spatial Rx configuration to receive one or more of: PDCCH, PDSCH, SSB, TRS, PTRS, and CSI-RS.

In some embodiments, the transmission is a PDSCH or PDCCH transmission.

Certain embodiments may provide one or more of the following technical advantage(s). For example, the disclosed unified DL and UL beam indication approach may offer the following advantages: 1) Highly flexible method for the network to dynamically select different beams, either from the same or different TRPs, for the transmission of DL data and control signals (PDSCH, PDCCH) and reception of UL data and control signals (PUSCH, PUCCH); 2) Increased system performance and robustness, especially for mm-wave operation; 3) Simple and low overhead DL signalling; and 4) Support of UEs both with and without DL/UL beam correspondence.

BRIEF DESCRIPTION OF THE DRAWINGS

The accompanying drawings, which are incorporated herein and form part of the specification, illustrate various embodiments.

DETAILED DESCRIPTION

Figure 1:
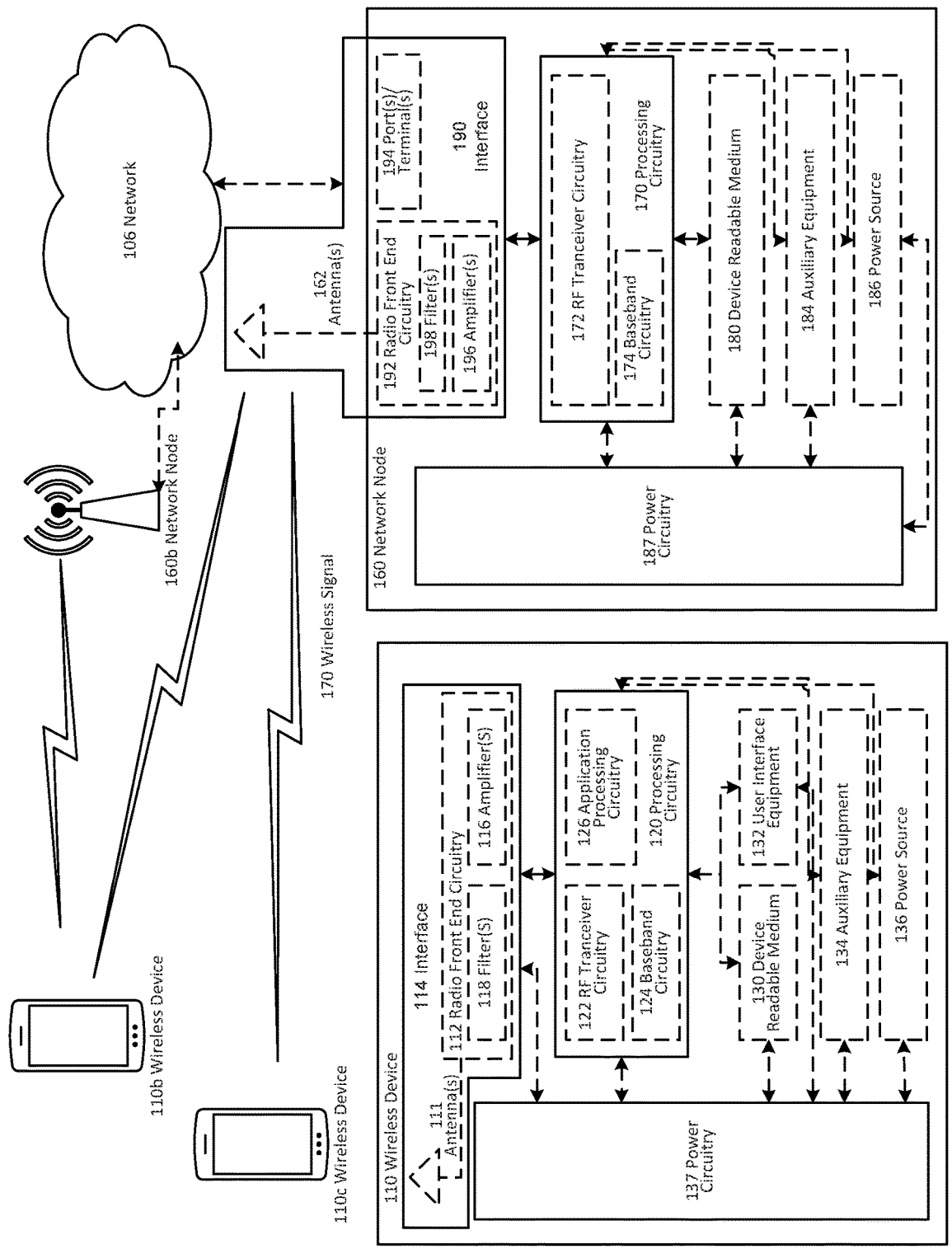
FIG. 1, which shows a wireless network in accordance with some embodiments.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art. Additional information may also be found in the document(s) provided in the Appendix.

In all the below embodiments, it is assumed that for a particular signalled TCI for beam indication purposes, the UE has already made an association between the TCI state and one or more DL(UL) RSs (contained in one or more RS sets, respectively) on which the UE and/or gNB has made prior measurement(s).

Application no. 62544534 discloses two methods for making this association, at least for DL RSs: (1) the gNB explicitly signals the DL RS index(es) associated with one or more TCI states and (2) the UE implicitly determines preferred DL RSs to be associated with a TCI state when aperiodic measurements are triggered on one or more sets of DL RSs. In the implicit method, a TCI is included in the same message that triggers the measurement so that the UE knows to which TCI state the preferred DL RSs should be associated. As disclosed in U.S. application No. 62/544,534, the DL RSs associated with a TCI state include, but are not limited to, CSI-RS, SSB. As disclosed herein (Embodiment #4), UL RSs may additionally be associated with a TCI state, and these include, but are not limited to SRS.

Since implicit/explicit association between DL/UL RSs and TCI states has been established at a prior point in time, when the UE receives beam indication signalling, it is able to use the DL or UL RSs associated with the signalled TCI as spatial QCL references for adjusting a transmit (Tx) spatial filter/spatial precoder/beam for transmission of one or more UL signals, e.g., PUSCH, PUCCH, SRS. In Embodiment #5 the UE uses the UL RSs associated with the signalled TCI as a spatial QCL reference for adjusting a receive (Rx) spatial filter/spatial precoder/beam for reception of one or more DL signals, e.g., PDCCH, PDSCH, SSB, TRS, PTRS, or CSI-RS. In what follows, the generic terms "spatial Tx/Rx configuration" are used to refer to a Tx/Rx spatial filter, spatial precoder, beamforming weights, and/or beam.

Embodiment #1 (Direct UL Beam Indication for UEs with DL/UL Beam Correspondence)

By DCI, the UE receives TCI plus an UL grant scheduling a PUSCH.
Based on a DL RS in at least one RS Set associated with the signalled TCI, the UE adjusts its spatial Tx configuration such that the spatial Tx configuration is reciprocal to the spatial Rx configuration associated with the DL RS (i.e., the spatial Rx configuration used to receive the DL RS).
The UE uses the spatial TX configuration for the purposes of transmitting one or more of PUCCH, PUSCH, or SRS and associated DMRS when applicable.
In the above, "reciprocal" can mean one or more of the following
  A UE Tx beam is oriented in the same direction as an Rx beam, but point in opposite ways.
  Ports of an uplink reference signal (PUCCH DMRS. PUSCH DMRS, SRS) are reciprocally and spatially quasi-co-located (QCL) with the ports of the DL RS.

Embodiment #2 (Indirect UL Beam Indication for UEs with DL/UL Beam Correspondence)

By DCI, the UE receives a TCI plus a DL grant scheduling a PDSCH.
At a later time, the UE receives an uplink grant scheduling a PUSCH (without TCI)
Based on a DL RS in at least one RS Set associated with the previously signalled TCI, the UE adjusts its spatial Tx configuration such that it is reciprocal to the spatial Rx configuration associated with the DL RS.
The UE uses the spatial TX configuration for the purposes of transmitting one or more of PUCCH, PUSCH, or SRS and associated DMRS when applicable.

Embodiment #3 (Direct UL Beam Indication for UEs without DL/UL Beam Correspondence)

By DCI, the UE receives TCI plus an UL grant scheduling a PUSCH.
Based on an UL RS in at least one RS Set associated with the signalled TCI, the UE adjusts its spatial Tx configuration such that it is substantially similar to the spatial Tx configuration associated with the UL RS.
The UE uses the spatial Tx configuration for the purposes of transmitting one or more of PUCCH, PUSCH, or SRS.

Embodiment #4 (Explicit Association of SRS with a TCI State)

The UE receives signalling from the gNB indicating at least one TCI and at least one UL RS index for which the UE shall make an association.
The UL RS index can be, but is not limited to, an SRS Resource Index (SRI) or an SRS resource ID.
The signalling method can be MAC-CE, DCI, or RRC.

Additional Embodiments Extending #1, 2, or 3

The UE may use different spatial TX configurations for the transmission of PUSCH and PUCCH:
  Example 1: The UE may use a spatial Tx configuration for the transmission of PUCCH that is reciprocal to the spatial Rx configuration associated with the PDCCH DMRS that carries either an UL or DL grant;
  Example 2: If the signalled TCI corresponds to a TCI state with 2 RS Sets, a spatial Tx configuration adjusted based on a DL or UL RS in one of the RS Sets may be used for transmission of PUCCH and a different spatial TX configuration adjusted to a DL or UL RS in the other RS Set may be used for transmission of PUSCH.
The UE may receive signalling of TCI through separate means than DCI, e.g., MAC-CE or RRC, for the purposes of adjusting its spatial TX configuration for the transmission of at least PUCCH.
The UE may utilize a single received TCI for multiple UL transmissions, for instance when receiving multiple uplink grants, when PUSCH is scheduled without receiving any new TCI, or when operating with UL grant free transmission.
The spatial Rx configuration associated with the DL RS may however have been updated after the transmission of the TCI in the DL grant and the TCI may thus still be appropriate for setting the UE's spatial Tx configuration for UL transmission.

Embodiment #5 (DL Beam Indication for gNB/UEs with DL/UL Beam Correspondence)

By DCI, the UE receives TCI plus a DL scheduling assignment of PDSCH.

Based on an UL RS in at least one RS Set associated with the signalled TCI, the UE adjusts its spatial Rx configuration such that it is reciprocal to the spatial Tx configuration associated with the UL RS.

The UE uses the spatial RX configuration for the purposes of receiving one or more of PDCCH, PDSCH, SSB, TRS, PTRS or CSI-RS and associated DMRS when applicable.

In the above, "reciprocal" can mean one or more of the following

A UE Tx beam is oriented in the same direction as an Rx beam or vice versa

Ports of an uplink reference signal (PUCCH DMRS, PUSCH DMRS, SRS) are reciprocally and spatially quasi-co-located (QCL) with the ports of the DL RS.

Although the subject matter described herein may be implemented in any appropriate type of system using any suitable components, the embodiments disclosed herein are described in relation to a wireless network, such as the example wireless network illustrated in FIG. 1, which shows a wireless network in accordance with some embodiments. For simplicity, the wireless network of FIG. 1 only depicts network 106, network nodes 160 and 160b, and WDs 110, 110b, and 110c. In practice, a wireless network may further include any additional elements suitable to support communication between wireless devices or between a wireless device and another communication device, such as a landline telephone, a service provider, or any other network node or end device. Of the illustrated components, network node 160 and wireless device (WD) 110 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/ or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 160 and WD 110 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes. OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 1, network node 160 includes processing circuitry 170, device readable medium 180, interface 190, auxiliary equipment 184, power source 186, power circuitry 187, and antenna 162. Although network node 160 illustrated in the example wireless network of FIG. 1 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 160 are depicted as single boxes located within a larger box, or nested within multiple boxes, in practice, a network node may comprise multiple different physical components that make up a single illustrated component (e.g., device readable medium 180 may comprise multiple separate hard drives as well as multiple RAM modules).

Similarly, network node 160 may be composed of multiple physically separate components (e.g., a NodeB component and a RNC component, or a BTS component and a BSC component, etc.), which may each have their own respective components. In certain scenarios in which network node 160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 160 may be configured to support multiple radio access technologies (RATs). In such embodiments, some components may be duplicated (e.g., separate device readable medium 180 for the different RATs) and some components may be reused (e.g., the same antenna 162 may be shared by the RATs). Network node 160 may also include multiple sets of the various illustrated components for different wireless technologies integrated into network node 160, such as, for example, GSM, WCDMA, LTE, NR, WiFi, or Bluetooth wireless technologies. These wireless technologies may be integrated into the same or different chip or set of chips and other components within network node 160.

Processing circuitry 170 is configured to perform any determining, calculating, or similar operations (e.g., certain obtaining operations) described herein as being provided by a network node. These operations performed by processing circuitry 170 may include processing information obtained by processing circuitry 170 by, for example, converting the obtained information into other information, comparing the obtained information or converted information to information stored in the network node, and/or performing one or more operations based on the obtained information or converted information, and as a result of said processing making a determination.

Processing circuitry 170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 160 components, such as device readable medium 180, network node 160 functionality. For example, processing circuitry 170 may execute instructions stored in device readable medium 180 or in memory within processing circuitry 170. Such functionality may include providing any of the various wireless features, functions, or benefits discussed herein. In some embodiments, processing circuitry 170 may include a system on a chip (SOC).

In some embodiments, processing circuitry 170 may include one or more of radio frequency (RF) transceiver circuitry 172 and baseband processing circuitry 174. In some embodiments, radio frequency (RF) transceiver circuitry 172 and baseband processing circuitry 174 may be on separate chips (or sets of chips), boards, or units, such as radio units and digital units. In alternative embodiments, part or all of RF transceiver circuitry 172 and baseband processing circuitry 174 may be on the same chip or set of chips, boards, or units In certain embodiments, some or all of the functionality described herein as being provided by a network node, base station, eNB or other such network device may be performed by processing circuitry 170 executing instructions stored on device readable medium 180 or memory within processing circuitry 170. In alternative embodiments, some or all of the functionality may be provided by processing circuitry 170 without executing instructions stored on a separate or discrete device readable medium, such as in a hard-wired manner. In any of those embodiments, whether executing instructions stored on a device readable storage medium or not, processing circuitry 170 can be configured to perform the described functionality. The benefits provided by such functionality are not limited to processing circuitry 170 alone or to other components of network node 160, but are enjoyed by network node 160 as a whole, and/or by end users and the wireless network generally.

Device readable medium 180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 170. Device readable medium 180 may store any suitable instructions, data or information, including a computer program, software, an application including one or more of logic, rules, code, tables, etc. and/or other instructions capable of being executed by processing circuitry 170 and, utilized by network node 160. Device readable medium 180 may be used to store any calculations made by processing circuitry 170 and/or any data received via interface 190. In some embodiments, processing circuitry 170 and device readable medium 180 may be considered to be integrated.

Interface 190 is used in the wired or wireless communication of signalling and/or data between network node 160, network 106, and/or WDs 110. As illustrated, interface 190 comprises port(s)/terminal(s) 194 to send and receive data, for example to and from network 106 over a wired connection. Interface 190 also includes radio front end circuitry 192 that may be coupled to, or in certain embodiments a part of, antenna 162. Radio front end circuitry 192 comprises filters 198 and amplifiers 196. Radio front end circuitry 192 may be connected to antenna 162 and processing circuitry 170. Radio front end circuitry may be configured to condition signals communicated between antenna 162 and processing circuitry 170. Radio front end circuitry 192 may receive digital data that is to be sent out to other network nodes or WDs via a wireless connection. Radio front end circuitry 192 may convert the digital data into a radio signal having the appropriate channel and bandwidth parameters using a combination of filters 198 and/or amplifiers 196. The radio signal may then be transmitted via antenna 162. Similarly, when receiving data, antenna 162 may collect radio signals which are then converted into digital data by radio front end circuitry 192. The digital data may be passed to processing circuitry 170. In other embodiments, the interface may comprise different components and/or different combinations of components.

In certain alternative embodiments, network node 160 may not include separate radio front end circuitry 192, instead, processing circuitry 170 may comprise radio front end circuitry and may be connected to antenna 162 without separate radio front end circuitry 192. Similarly, in some embodiments, all or some of RF transceiver circuitry 172 may be considered a part of interface 190. In still other embodiments, interface 190 may include one or more ports or terminals 194, radio front end circuitry 192, and RF transceiver circuitry 172, as part of a radio unit (not shown), and interface 190 may communicate with baseband processing circuitry 174, which is part of a digital unit (not shown).

Antenna 162 may include one or more antennas, or antenna arrays, configured to send and/or receive wireless signals. Antenna 162 may be coupled to radio front end circuitry 190 and may be any type of antenna capable of transmitting and receiving data and/or signals wirelessly. In some embodiments, antenna 162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 162 may be separate from network node 160 and may be connectable to network node 160 through an interface or port.

Antenna 162, interface 190, and/or processing circuitry 170 may be configured to perform any receiving operations and/or certain obtaining operations described herein as being performed by a network node. Any information, data and/or signals may be received from a wireless device, another network node and/or any other network equipment. Similarly, antenna 162, interface 190, and/or processing circuitry 170 may be configured to perform any transmitting operations described herein as being performed by a network node. Any information, data and/or signals may be transmitted to a wireless device, another network node and/or any other network equipment.

Power circuitry 187 may comprise, or be coupled to, power management circuitry and is configured to supply the components of network node 160 with power for performing the functionality described herein. Power circuitry 187 may receive power from power source 186. Power source 186 and/or power circuitry 187 may be configured to provide power to the various components of network node 160 in a form suitable for the respective components (e.g., at a voltage and current level needed for each respective component). Power source 186 may either be included in, or external to, power circuitry 187 and/or network node 160. For example, network node 160 may be connectable to an external power source (e.g., an electricity outlet) via an input circuitry or interface such as an electrical cable, whereby the external power source supplies power to power circuitry 187. As a further example, power source 186 may comprise a source of power in the form of a battery or battery pack which is connected to, or integrated in, power circuitry 187. The battery may provide backup power should the external power source fail. Other types of power sources, such as photovoltaic devices, may also be used.

Alternative embodiments of network node 160 may include additional components beyond those shown in FIG. 1 that may be responsible for providing certain aspects of the network node's functionality, including any of the functionality described herein and/or any functionality necessary to support the subject matter described herein. For example, network node 160 may include user interface equipment to allow input of information into network node 160 and to allow output of information from network node 160. This may allow a user to perform diagnostic, maintenance, repair, and other administrative functions for network node 160.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE), a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 110 includes antenna 111, interface 114, processing circuitry 120, device readable medium 130, user interface equipment 132, auxiliary equipment 134, power source 136 and power circuitry 137. WD 110 may include multiple sets of one or more of the illustrated components for different wireless technologies supported by WD 110, such as, for example, GSM, WCDMA, LTE, NR, WiFi. WiMAX, or Bluetooth wireless technologies, just to mention a few. These wireless technologies may be integrated into the same or different chips or set of chips as other components within WD 110.

Antenna 111 may include one or more antennas or antenna arrays, configured to send and/or receive wireless signals, and is connected to interface 114. In certain alternative embodiments, antenna 111 may be separate from WD 110 and be connectable to WD 110 through an interface or port. Antenna 111, interface 114, and/or processing circuitry 120 may be configured to perform any receiving or transmitting operations described herein as being performed by a WD. Any information, data and/or signals may be received from a network node and/or another WD. In some embodiments, radio front end circuitry and/or antenna 111 may be considered an interface.

As illustrated, interface 114 comprises radio front end circuitry 112 and antenna 111. Radio front end circuitry 112 comprise one or more filters 118 and amplifiers 116. Radio front end circuitry 114 is connected to antenna 111 and processing circuitry 120, and is configured to condition signals communicated between antenna 111 and processing circuitry 120. Radio front end circuitry 112 may be coupled to or a part of antenna 111. In some embodiments, WD 110 may not include separate radio front end circuitry 112; rather, processing circuitry 120 may comprise radio front end circuitry and may be connected to antenna 111. Similarly, in some embodiments, some or all of RF transceiver circuitry 122 may be considered a part of interface 114. Radio front end circuitry 112 may receive digital data that is to be sent out to other network nodes or WDs via a wireless connection. Radio front end circuitry 112 may convert the digital data into a radio signal having the appropriate channel and bandwidth parameters using a combination of filters 118 and/or amplifiers 116. The radio signal may then be transmitted via antenna 111. Similarly, when receiving data, antenna 111 may collect radio signals which are then converted into digital data by radio front end circuitry 112. The digital data may be passed to processing circuitry 120. In other embodiments, the interface may comprise different components and/or different combinations of components.

Processing circuitry 120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 110 components, such as device readable medium 130, WD 110 functionality. Such functionality may include providing any of the various wireless features or benefits discussed herein. For example, processing circuitry 120 may execute instructions stored in device readable medium 130 or in memory within processing circuitry 120 to provide the functionality disclosed herein.

As illustrated, processing circuitry 120 includes one or more of RF transceiver circuitry 122, baseband processing circuitry 124, and application processing circuitry 126. In other embodiments, the processing circuitry may comprise different components and/or different combinations of components. In certain embodiments processing circuitry 120 of WD 110 may comprise a SOC. In some embodiments, RF transceiver circuitry 122, baseband processing circuitry 124, and application processing circuitry 126 may be on separate chips or sets of chips. In alternative embodiments, part or all of baseband processing circuitry 124 and application processing circuitry 126 may be combined into one chip or set of chips, and RF transceiver circuitry 122 may be on a separate chip or set of chips. In still alternative embodiments, part or all of RF transceiver circuitry 122 and baseband processing circuitry 124 may be on the same chip or set of chips, and application processing circuitry 126 may be on a separate chip or set of chips. In yet other alternative embodiments, part or all of RF transceiver circuitry 122, baseband processing circuitry 124, and application processing circuitry 126 may be combined in the same chip or set of chips. In some embodiments, RF transceiver circuitry 122 may be a part of interface 114. RF transceiver circuitry 122 may condition RF signals for processing circuitry 120.

In certain embodiments, some or all of the functionality described herein as being performed by a WD may be provided by processing circuitry 120 executing instructions stored on device readable medium 130, which in certain embodiments may be a computer-readable storage medium. In alternative embodiments, some or all of the functionality may be provided by processing circuitry 120 without executing instructions stored on a separate or discrete device readable storage medium, such as in a hard-wired manner. In any of those particular embodiments, whether executing instructions stored on a device readable storage medium or not, processing circuitry 120 can be configured to perform the described functionality. The benefits provided by such functionality are not limited to processing circuitry 120 alone or to other components of WD 110, but are enjoyed by WD 110 as a whole, and/or by end users and the wireless network generally.

Processing circuitry 120 may be configured to perform any determining, calculating, or similar operations (e.g., certain obtaining operations) described herein as being performed by a WD. These operations, as performed by processing circuitry 120, may include processing information obtained by processing circuitry 120 by, for example, converting the obtained information into other information, comparing the obtained information or converted information to information stored by WD 110, and/or performing one or more operations based on the obtained information or converted information, and as a result of said processing making a determination.

Device readable medium 130 may be operable to store a computer program, software, an application including one or more of logic, rules, code, tables, etc. and/or other instructions capable of being executed by processing circuitry 120. Device readable medium 130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 120. In some embodiments, processing circuitry 120 and device readable medium 130 may be considered to be integrated.

User interface equipment 132 may provide components that allow for a human user to interact with WD 110. Such interaction may be of many forms, such as visual, audial, tactile, etc. User interface equipment 132 may be operable to produce output to the user and to allow the user to provide input to WD 110. The type of interaction may vary depending on the type of user interface equipment 132 installed in WD 110. For example, if WD 110 is a smart phone, the interaction may be via a touch screen; if WD 110 is a smart meter, the interaction may be through a screen that provides usage (e.g., the number of gallons used) or a speaker that provides an audible alert (e.g., if smoke is detected). User interface equipment 132 may include input interfaces, devices and circuits, and output interfaces, devices and circuits. User interface equipment 132 is configured to allow input of information into WD 110, and is connected to processing circuitry 120 to allow processing circuitry 120 to process the input information. User interface equipment 132 may include, for example, a microphone, a proximity or other sensor, keys/buttons, a touch display, one or more cameras, a USB port, or other input circuitry. User interface equipment 132 is also configured to allow output of information from WD 110, and to allow processing circuitry 120 to output information from WD 110. User interface equipment 132 may include, for example, a speaker, a display, vibrating circuitry, a USB port, a headphone interface, or other output circuitry. Using one or more input and output interfaces, devices, and circuits, of user interface equipment 132, WD 110 may communicate with end users and/or the wireless network, and allow them to benefit from the functionality described herein.

Auxiliary equipment 134 is operable to provide more specific functionality which may not be generally performed by WDs. This may comprise specialized sensors for doing measurements for various purposes, interfaces for additional types of communication such as wired communications etc. The inclusion and type of components of auxiliary equipment 134 may vary depending on the embodiment and/or scenario.

Power source 136 may, in some embodiments, be in the form of a battery or battery pack. Other types of power sources, such as an external power source (e.g., an electricity outlet), photovoltaic devices or power cells, may also be used. WD 110 may further comprise power circuitry 137 for delivering power from power source 136 to the various parts of WD 110 which need power from power source 136 to carry out any functionality described or indicated herein. Power circuitry 137 may in certain embodiments comprise power management circuitry. Power circuitry 137 may additionally or alternatively be operable to receive power from an external power source; in which case WD 110 may be connectable to the external power source (such as an electricity outlet) via input circuitry or an interface such as an electrical power cable. Power circuitry 137 may also in certain embodiments be operable to deliver power from an external power source to power source 136. This may be, for example, for the charging of power source 136. Power circuitry 137 may perform any formatting, converting, or other modification to the power from power source 136 to make the power suitable for the respective components of WD 110 to which power is supplied.

Figure 2:
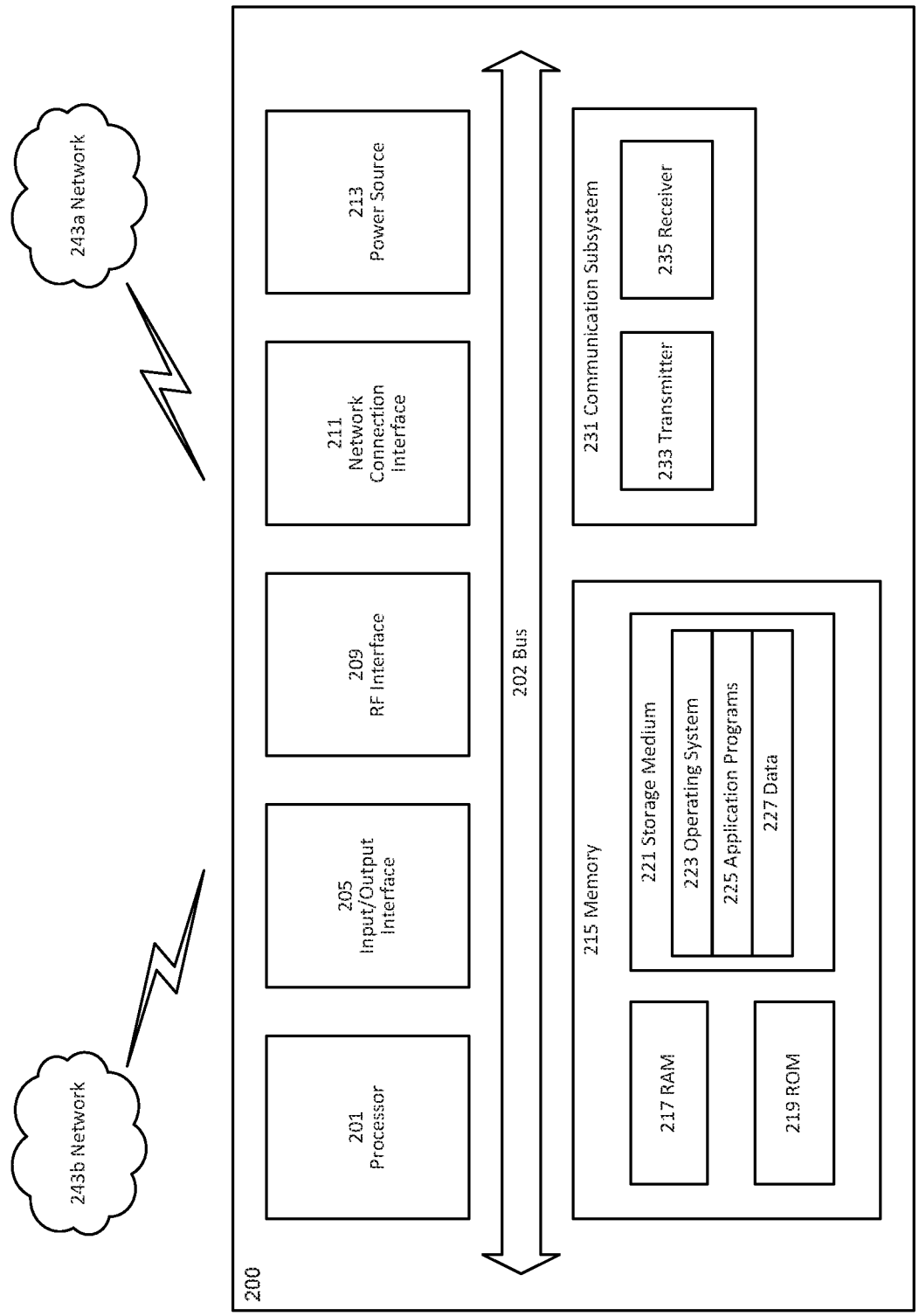
FIG. 2 illustrates one embodiment of a UE in accordance with various aspects.

FIG. 2 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 2200 may be any UE identified by the 3 Generation Partnership Project (3GPP), including a NB-loT UE, a machine type communication (MTC) UE, and/or an enhanced MTC (eMTC) UE. UE 200, as illustrated in FIG. 2, is one example of a WD configured for communication in accordance with one or more communication standards promulgated by the $3^{rd}$ Generation Partnership Project (3GPP), such as 3GPP's GSM, UMTS, LTE, and/or 5G standards. As mentioned previously, the term WD and UE may be used interchangeable. Accordingly, although FIG. 2 is a UE, the components discussed herein are equally applicable to a WD, and vice-versa.

In FIG. 2. UE 200 includes processing circuitry 201 that is operatively coupled to input/output interface 205, radio frequency (RF) interface 209, network connection interface 211, memory 215 including random access memory (RAM) 217, read-only memory (ROM) 219, and storage medium 221 or the like, communication subsystem 231, power source 233, and/or any other component, or any combination thereof. Storage medium 221 includes operating system 223, application program 225, and data 227. In other embodiments, storage medium 221 may include other similar types of information. Certain UEs may utilize all of the components shown in FIG. 2, or only a subset of the components. The level of integration between the components may vary from one UE to another UE. Further, certain UEs may contain multiple instances of a component, such as multiple processors, memories, transceivers, transmitters, receivers, etc.

In FIG. 2, processing circuitry 201 may be configured to process computer instructions and data. Processing circuitry 201 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 201 may include two central processing units (CPUs). Data may be information in a form suitable for use by a computer.

In the depicted embodiment, input/output interface 205 may be configured to provide a communication interface to an input device, output device, or input and output device. UE 200 may be configured to use an output device via input/output interface 205. An output device may use the same type of interface port as an input device. For example, a USB port may be used to provide input to and output from UE 200. The output device may be a speaker, a sound card, a video card, a display, a monitor, a printer, an actuator, an emitter, a smartcard, another output device, or any combination thereof. UE 200 may be configured to use an input device via input/output interface 205 to allow a user to capture information into UE 200. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 2, RF interface 209 may be configured to provide a communication interface to RF components such as a transmitter, a receiver, and an antenna. Network connection interface 211 may be configured to provide a communication interface to network 243a. Network 243a may encompass wired and/or wireless networks such as a local-area network (LAN), a wide-area network (WAN), a computer network, a wireless network, a telecommunications network, another like network or any combination thereof. For example, network 243a may comprise a Wi-Fi network. Network connection interface 211 may be configured to include a receiver and a transmitter interface used to communicate with one or more other devices over a communication network according to one or more communication protocols, such as Ethernet. TCP/IP, SONET, ATM, or the like. Network connection interface 211 may implement receiver and transmitter functionality appropriate to the communication network links (e.g., optical, electrical, and the like). The transmitter and receiver functions may share circuit components, software or firmware, or alternatively may be implemented separately.

RAM 217 may be configured to interface via bus 202 to processing circuitry 201 to provide storage or caching of data or computer instructions during the execution of software programs such as the operating system, application programs, and device drivers. ROM 219 may be configured to provide computer instructions or data to processing circuitry 201. For example, ROM 219 may be configured to store invariant low-level system code or data for basic system functions such as basic input and output (I/O), startup, or reception of keystrokes from a keyboard that are stored in a non-volatile memory. Storage medium 221 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 221 may be configured to include operating system 223, application program 225 such as a web browser application, a widget or gadget engine or another application, and data file 227. Storage medium 221 may store, for use by UE 200, any of a variety of various operating systems or combinations of operating systems.

Storage medium 221 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 221 may allow UE 200 to access computer-executable instructions, application programs or the like, stored on transitory or non-transitory memory media, to off-load data, or to upload data. An article of manufacture, such as one utilizing a communication system may be tangibly embodied in storage medium 221, which may comprise a device readable medium.

In FIG. 2, processing circuitry 201 may be configured to communicate with network 243b using communication subsystem 231. Network 243a and network 243b may be the same network or networks or different network or networks. Communication subsystem 231 may be configured to include one or more transceivers used to communicate with network 243b. For example, communication subsystem 231 may be configured to include one or more transceivers used to communicate with one or more remote transceivers of another device capable of wireless communication such as another WD, UE, or base station of a radio access network (RAN) according to one or more communication protocols, such as IEEE 802.11, CDMA, WCDMA, GSM, LTE, UTRAN, WiMax, or the like. Each transceiver may include transmitter 233 and/or receiver 235 to implement transmitter or receiver functionality, respectively, appropriate to the RAN links (e.g., frequency allocations and the like). Further, transmitter 233 and receiver 235 of each transceiver may share circuit components, software or firmware, or alternatively may be implemented separately.

In the illustrated embodiment, the communication functions of communication subsystem 231 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 231 may include cellular communication, Wi-Fi communication, Bluetooth communication, and GPS communication. Network 243b may encompass wired and/or wireless networks such as a local-area network (LAN), a wide-area network (WAN), a computer network, a wireless network, a telecommunications network, another like network or any combination thereof. For example, network 243b may be a cellular network, a Wi-Fi network, and/or a near-field network. Power source 213 may be configured to provide alternating current (AC) or direct current (DC) power to components of UE 200.

The features, benefits and/or functions described herein may be implemented in one of the components of UE 200 or partitioned across multiple components of UE 200. Further, the features, benefits, and/or functions described herein may be implemented in any combination of hardware, software or firmware. In one example, communication subsystem 231 may be configured to include any of the components described herein. Further, processing circuitry 201 may be configured to communicate with any of such components over bus 202. In another example, any of such components may be represented by program instructions stored in memory that when executed by processing circuitry 201 perform the corresponding functions described herein. In another example, the functionality of any of such components may be partitioned between processing circuitry 201 and communication subsystem 231. In another example, the non-computationally intensive functions of any of such components may be implemented in software or firmware and the computationally intensive functions may be implemented in hardware.

Figure 3:
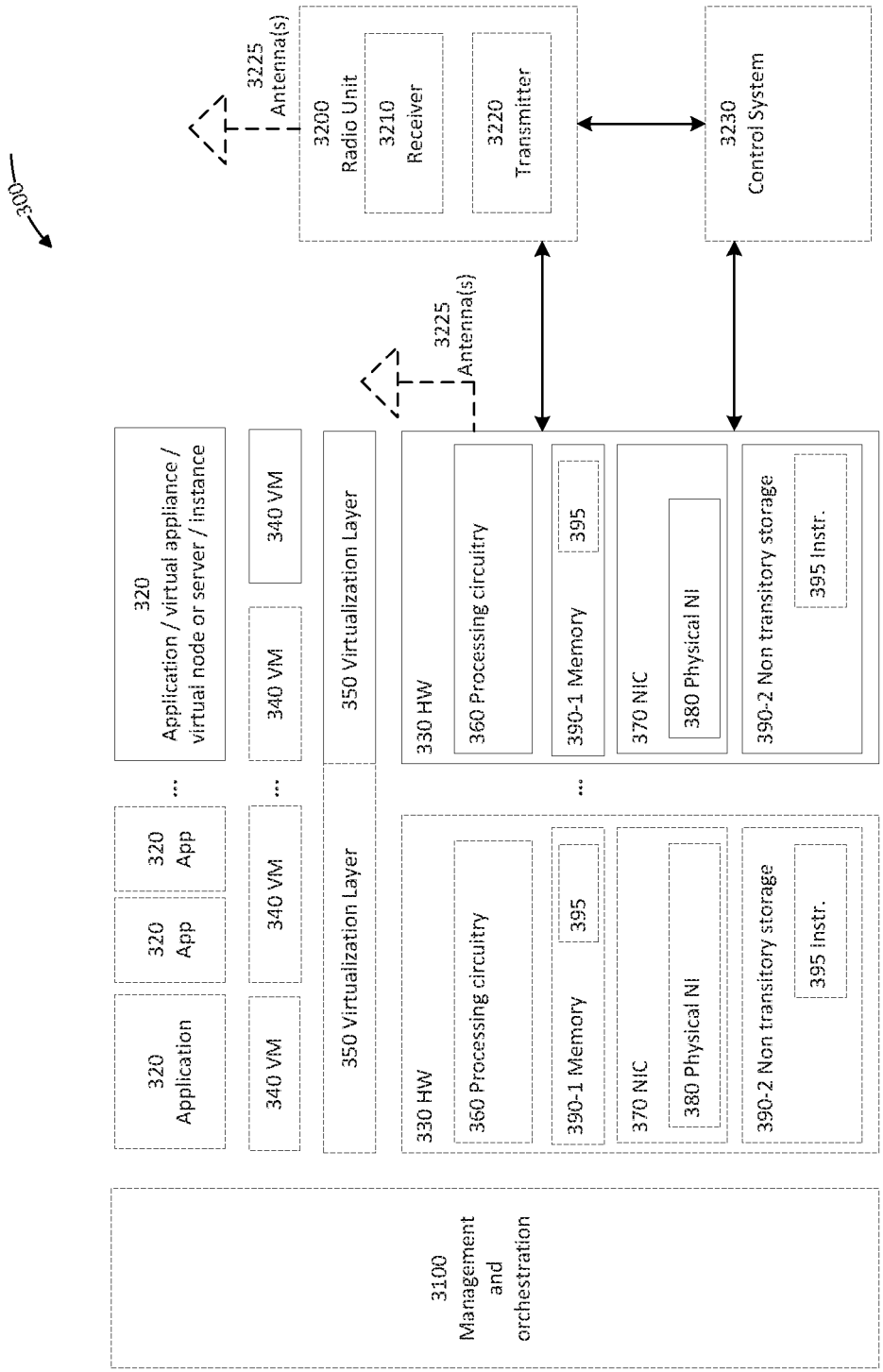
FIG. 3 is a schematic block diagram illustrating a virtualization environment according to some embodiments.

FIG. 3 is a schematic block diagram illustrating a virtualization environment 300, according to some embodiments, in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 300 hosted by one or more of hardware nodes 330. Further, in embodiments in which the virtual node is not a radio access node or does not require radio connectivity (e.g., a core network node), then the network node may be entirely virtualized.

The functions may be implemented by one or more applications 320 (which may alternatively be called software instances, virtual appliances, network functions, virtual nodes, virtual network functions, etc.) operative to implement some of the features, functions, and/or benefits of some of the embodiments disclosed herein. Applications 320 are run in virtualization environment 300 which provides hardware 330 comprising processing circuitry 360 and memory 390. Memory 390 contains instructions 395 executable by processing circuitry 360 whereby application 320 is operative to provide one or more of the features, benefits, and/or functions disclosed herein.

Virtualization environment 300, comprises general-purpose or special-purpose network hardware devices 330 comprising a set of one or more processors or processing circuitry 360, which may be commercial off-the-shelf (COTS) processors, dedicated Application Specific Integrated Circuits (ASICs), or any other type of processing circuitry including digital or analog hardware components or special purpose processors. Each hardware device may comprise memory 390-1 which may be non-persistent memory for temporarily storing instructions 395 or software executed by processing circuitry 360. Each hardware device may comprise one or more network interface controllers (NICs) 370, also known as network interface cards, which include physical network interface 380. Each hardware device may also include non-transitory, persistent, machine-readable storage media 390-2 having stored therein software 395 and/or instructions executable by processing circuitry 360. Software 395 may include any type of software including software for instantiating one or more virtualization layers 350 (also referred to as hypervisors), software to execute virtual machines 340 as well as software allowing it to execute functions, features and/or benefits described in relation with some embodiments described herein.

Virtual machines 340, comprise virtual processing, virtual memory, virtual networking or interface and virtual storage, and may be run by a corresponding virtualization layer 350 or hypervisor. Different embodiments of the instance of virtual appliance 320 may be implemented on one or more of virtual machines 340, and the implementations may be made in different ways.

During operation, processing circuitry 360 executes software 395 to instantiate the hypervisor or virtualization layer 350, which may sometimes be referred to as a virtual machine monitor (VMM). Virtualization layer 350 may present a virtual operating platform that appears like networking hardware to virtual machine 340.

As shown in FIG. 3, hardware 330 may be a standalone network node with generic or specific components. Hardware 330 may comprise antenna 3225 and may implement some functions via virtualization. Alternatively, hardware 330 may be part of a larger cluster of hardware (e.g. such as in a data center or customer premise equipment (CPE)) where many hardware nodes work together and are managed via management and orchestration (MANO) 3100, which, among others, oversees lifecycle management of applications 320.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 340 may be a software implementation of a physical machine that runs programs as if they were executing on a physical, non-virtualized machine. Each of virtual machines 340, and that part of hardware 330 that executes that virtual machine, be it hardware dedicated to that virtual machine and/or hardware shared by that virtual machine with others of the virtual machines 340, forms a separate virtual network elements (VNE).

Still in the context of NFV, Virtual Network Function (VNF) is responsible for handling specific network functions that run in one or more virtual machines 340 on top of hardware networking infrastructure 330 and corresponds to application 320 in FIG. 3.

In some embodiments, one or more radio units 3200 that each include one or more transmitters 3220 and one or more receivers 3210 may be coupled to one or more antennas 3225. Radio units 3200 may communicate directly with hardware nodes 330 via one or more appropriate network interfaces and may be used in combination with the virtual components to provide a virtual node with radio capabilities, such as a radio access node or a base station.

In some embodiments, some signalling can be effected with the use of control system 3230 which may alternatively be used for communication between the hardware nodes 330 and radio units 3200.

Figure 4:
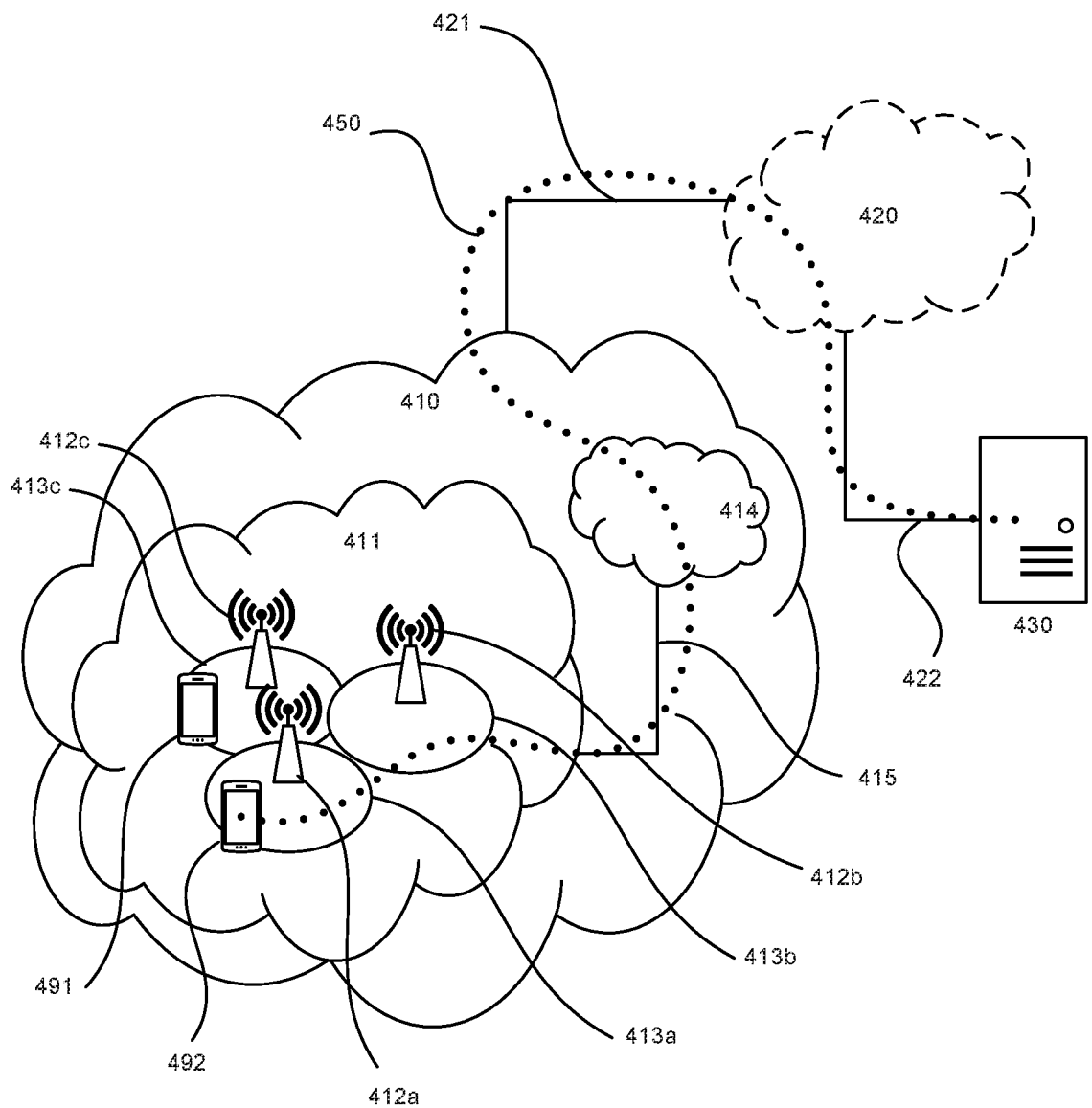
FIG. 4 schematically illustrates a telecommunication network connected via an intermediate network to a host computer.

With reference to FIG. 4, in accordance with an embodiment, a communication system includes telecommunication network 410, such as a 3GPP-type cellular network, which comprises access network 411, such as a radio access network, and core network 414. Access network 411 comprises a plurality of base stations 412a, 412b, 412c, such as NBs, eNBs, gNBs or other types of wireless access points, each defining a corresponding coverage area 413a, 413b, 413c. Each base station 412a, 412b, 412c is connectable to core network 414 over a wired or wireless connection 415. A first UE 491 located in coverage area 413c is configured to wirelessly connect to, or be paged by, the corresponding base station 412c. A second UE 492 in coverage area 413a is wirelessly connectable to the corresponding base station 412a. While a plurality of UEs 491, 492 are illustrated in this example, the disclosed embodiments are equally applicable to a situation where a sole UE is in the coverage area or where a sole UE is connecting to the corresponding base station 412.

Telecommunication network 410 is itself connected to host computer 430, which may be embodied in the hardware and/or software of a standalone server, a cloud-implemented server, a distributed server or as processing resources in a server farm. Host computer 430 may be under the ownership or control of a service provider, or may be operated by the service provider or on behalf of the service provider. Connections 421 and 422 between telecommunication network 410 and host computer 430 may extend directly from core network 414 to host computer 430 or may go via an optional intermediate network 420. Intermediate network 420 may be one of, or a combination of more than one of, a public, private or hosted network; intermediate network 420, if any, may be a backbone network or the Internet; in particular, intermediate network 420 may comprise two or more sub-networks (not shown).

The communication system of FIG. 4 as a whole enables connectivity between the connected UEs 491, 492 and host computer 430. The connectivity may be described as an over-the-top (OTT) connection 450. Host computer 430 and the connected UEs 491, 492 are configured to communicate data and/or signaling via OTT connection 450, using access network 411, core network 414, any intermediate network 420 and possible further infrastructure (not shown) as intermediaries. OTT connection 450 may be transparent in the sense that the participating communication devices through which OTT connection 450 passes are unaware of routing of uplink and downlink communications. For example, base station 412 may not or need not be informed about the past routing of an incoming downlink communication with data originating from host computer 430 to be forwarded (e.g., handed over) to a connected UE 491. Similarly, base station 412 need not be aware of the future routing of an outgoing uplink communication originating from the UE 491 towards the host computer 430.

Example implementations, in accordance with an embodiment, of the UE, base station and host computer discussed in the preceding paragraphs will now be described with reference to FIG. 5, which shows a communication system 5000 having a host computer communicating via a base station with a user equipment over a partially wireless connection in accordance with some embodiments.

In communication system 500, host computer 510 comprises hardware 515 including communication interface 516 configured to set up and maintain a wired or wireless connection with an interface of a different communication device of communication system 500. Host computer 510 further comprises processing circuitry 518, which may have storage and/or processing capabilities. In particular, processing circuitry 518 may comprise one or more programmable processors, application-specific integrated circuits, field programmable gate arrays or combinations of these (not shown) adapted to execute instructions. Host computer 510 further comprises software 511, which is stored in or accessible by host computer 510 and executable by processing circuitry 518. Software 511 includes host application 512. Host application 512 may be operable to provide a service to a remote user, such as UE 530 connecting via OTT connection 550 terminating at UE 530 and host computer 510. In providing the service to the remote user, host application 512 may provide user data which is transmitted using OTT connection 550.

Communication system 500 further includes base station 520 provided in a telecommunication system and comprising hardware 525 enabling it to communicate with host computer 510 and with UE 530. Hardware 525 may include communication interface 526 for setting up and maintaining a wired or wireless connection with an interface of a different communication device of communication system 500, as well as radio interface 527 for setting up and maintaining at least wireless connection 570 with UE 530 located in a coverage area (not shown in FIG. 5) served by base station 520. Communication interface 526 may be configured to facilitate connection 560 to host computer 510. Connection 560 may be direct or it may pass through a core network (not shown in FIG. 5) of the telecommunication system and/or through one or more intermediate networks outside the telecommunication system. In the embodiment shown, hardware 525 of base station 520 further includes processing circuitry 528, which may comprise one or more programmable processors, application-specific integrated circuits, field programmable gate arrays or combinations of these (not shown) adapted to execute instructions. Base station 520 further has software 521 stored internally or accessible via an external connection.

Communication system 500 further includes UE 530 already referred to. Its hardware 535 may include radio interface 537 configured to set up and maintain wireless connection 570 with a base station serving a coverage area in which UE 530 is currently located. Hardware 535 of UE 530 further includes processing circuitry 538, which may comprise one or more programmable processors, application-specific integrated circuits, field programmable gate arrays or combinations of these (not shown) adapted to execute instructions. UE 530 further comprises software 531, which is stored in or accessible by UE 530 and executable by processing circuitry 538. Software 531 includes client application 532. Client application 532 may be operable to provide a service to a human or non-human user via UE 530, with the support of host computer 510. In host computer 510, an executing host application 512 may communicate with the executing client application 532 via OTT connection 550 terminating at UE 530 and host computer 510. In providing the service to the user, client application 532 may receive request data from host application 512 and provide user data in response to the request data. OTT connection 550 may transfer both the request data and the user data. Client application 532 may interact with the user to generate the user data that it provides.

Figure 5:
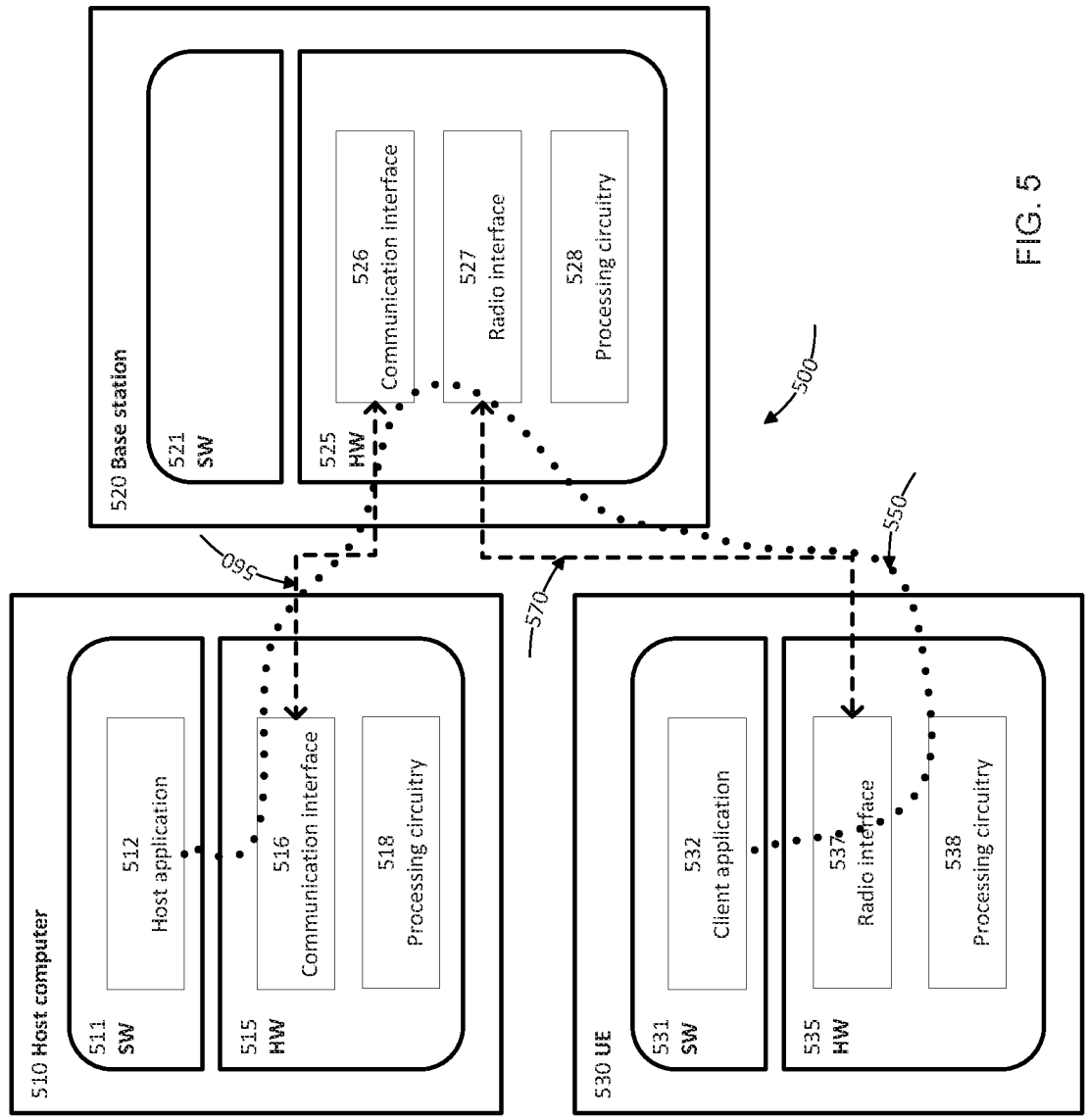
FIG. 5 is a generalized block diagram of a host computer communicating via a base station with a user equipment over a partially wireless connection.

It is noted that host computer 510, base station 520 and UE 530 illustrated in FIG. 5 may be similar or identical to host computer 430, one of base stations 412a, 412b. 412c and one of UEs 491, 492 of FIG. 4, respectively. This is to say, the inner workings of these entities may be as shown in FIG. 5 and independently, the surrounding network topology may be that of FIG. 4.

In FIG. 5, OTT connection 550 has been drawn abstractly to illustrate the communication between host computer 510 and UE 530 via base station 520, without explicit reference to any intermediary devices and the precise routing of messages via these devices. Network infrastructure may determine the routing, which it may be configured to hide from UE 530 or from the service provider operating host computer 510, or both. While OTT connection 550 is active, the network infrastructure may further take decisions by which it dynamically changes the routing (e.g., on the basis of load balancing consideration or reconfiguration of the network).

Wireless connection 570 between UE 530 and base station 520 is in accordance with the teachings of the embodiments described throughout this disclosure. One or more of the various embodiments improve the performance of OTT services provided to UE 530 using OTT connection 550, in which wireless connection 570 forms the last segment. More precisely, the teachings of these embodiments may improve network performance by enabling a TRP (e.g., base station) to transmit a beam indication (e.g., a QRI) to a UE, which is configured to use the beam indication to determine an advantageous receiver and/or transmitter configuration with which the beam information is associated and use the determined receiver/transmitter configuration to receive data transmitted by the TRP and/or to transmit data to the TRP, thereby provide benefits such as reduced overheard, reduced latency, improved received signal quality.

A measurement procedure may be provided for the purpose of monitoring data rate, latency and other factors on which the one or more embodiments improve. There may further be an optional network functionality for reconfiguring OTT connection 550 between host computer 510 and UE 530, in response to variations in the measurement results. The measurement procedure and/or the network functionality for reconfiguring OTT connection 550 may be implemented in software 511 and hardware 515 of host computer 510 or in software 531 and hardware 535 of UE 530, or both. In embodiments, sensors (not shown) may be deployed in or in association with communication devices through which OTT connection 550 passes; the sensors may participate in the measurement procedure by supplying values of the monitored quantities exemplified above, or supplying values of other physical quantities from which software 511, 531 may compute or estimate the monitored quantities. The reconfiguring of OTT connection 550 may include message format, retransmission settings, preferred routing etc.; the reconfiguring need not affect base station 520, and it may be unknown or imperceptible to base station 520. Such procedures and functionalities may be known and practiced in the art. In certain embodiments, measurements may involve proprietary UE signaling facilitating host computer 510's measurements of throughput, propagation times, latency and the like. The measurements may be implemented in that software 511 and 531 causes messages to be transmitted, in particular empty or 'dummy' messages, using OTT connection 550 while it monitors propagation times, errors etc.

Figure 6:
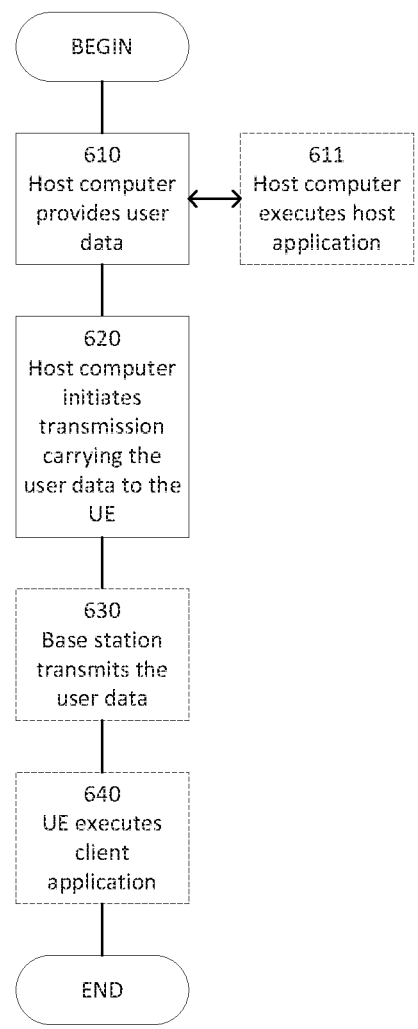
FIG. 6 is a flowchart illustrating a method implemented in a communication system including a host computer, a base station and a user equipment.

FIG. 6 is a flowchart illustrating a method implemented in a communication system, in accordance with one embodiment. The communication system includes a host computer, a base station and a UE which may be those described with reference to FIGS. 4 and 5. For simplicity of the present disclosure, only drawing references to FIG. 6 will be included in this section. In step 610, the host computer provides user data. In substep 611 (which may be optional) of step 610, the host computer provides the user data by executing a host application. In step 620, the host computer initiates a transmission carrying the user data to the UE. In step 630 (which may be optional), the base station transmits to the UE the user data which was carried in the transmission that the host computer initiated, in accordance with the teachings of the embodiments described throughout this disclosure. In step 640 (which may also be optional), the UE executes a client application associated with the host application executed by the host computer.

Figure 7:
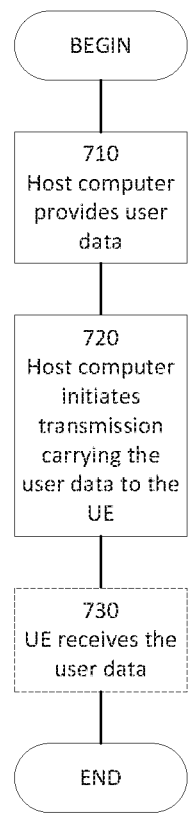
FIG. 7 is a flowchart illustrating a method implemented in a communication system including a host computer, a base station and a user equipment.

FIG. 7 is a flowchart illustrating a method implemented in a communication system, in accordance with one embodiment. The communication system includes a host computer, a base station and a UE which may be those described with reference to FIGS. 4 and 5. For simplicity of the present disclosure, only drawing references to FIG. 7 will be included in this section. In step 710 of the method, the host computer provides user data. In an optional substep (not shown) the host computer provides the user data by executing a host application. In step 720, the host computer initiates a transmission carrying the user data to the UE. The transmission may pass via the base station, in accordance with the teachings of the embodiments described throughout this disclosure. In step 730 (which may be optional), the UE receives the user data carried in the transmission.

Figure 8:
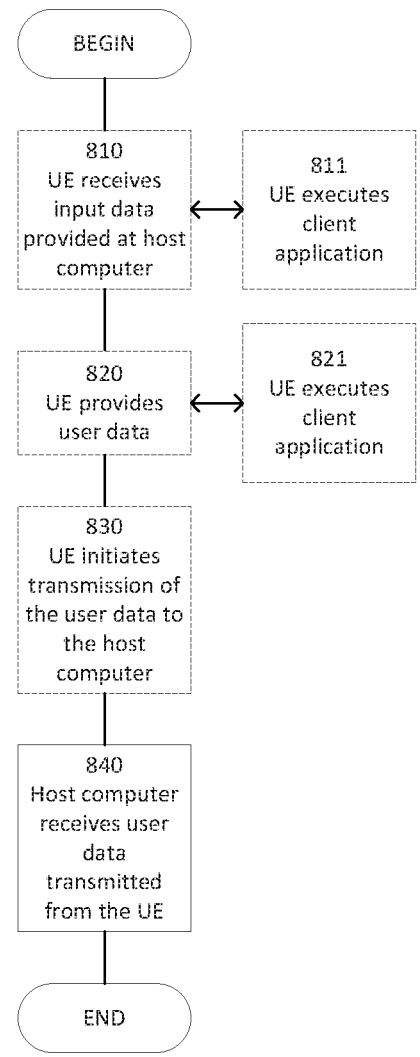
FIG. 8 is a flowchart illustrating a method implemented in a communication system including a host computer, a base station and a user equipment.

FIG. 8 is a flowchart illustrating a method implemented in a communication system, in accordance with one embodiment. The communication system includes a host computer, a base station and a UE which may be those described with reference to FIGS. 4 and 5. For simplicity of the present disclosure, only drawing references to FIG. 8 will be included in this section. In step 810 (which may be optional), the UE receives input data provided by the host computer. Additionally or alternatively, in step 820, the UE provides user data. In substep 821 (which may be optional) of step 820, the UE provides the user data by executing a client application. In substep 811 (which may be optional) of step 810, the UE executes a client application which provides the user data in reaction to the received input data provided by the host computer. In providing the user data, the executed client application may further consider user input received from the user. Regardless of the specific manner in which the user data was provided, the UE initiates, in substep 830 (which may be optional), transmission of the user data to the host computer in accordance with the teachings of the embodiments described throughout this disclosure. In step 840 of the method, the host computer receives the user data transmitted from the UE.

Figure 9:
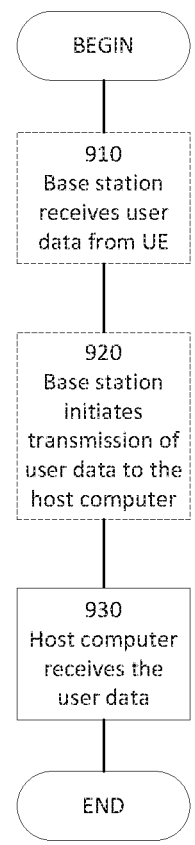
FIG. 9 is a flowchart illustrating a method implemented in a communication system including a host computer, a base station and a user equipment.

FIG. 9 is a flowchart illustrating a method implemented in a communication system, in accordance with one embodiment. The communication system includes a host computer, a base station and a UE which may be those described with reference to FIGS. 4 and 5. For simplicity of the present disclosure, only drawing references to FIG. 9 will be included in this section. In step 910 (which may be optional), in accordance with the teachings of the embodiments described throughout this disclosure, the base station receives user data from the UE. In step 920 (which may be optional), the base station initiates transmission of the received user data to the host computer. In step 930 (which may be optional), the host computer receives the user data carried in the transmission initiated by the base station.

Figure 10:
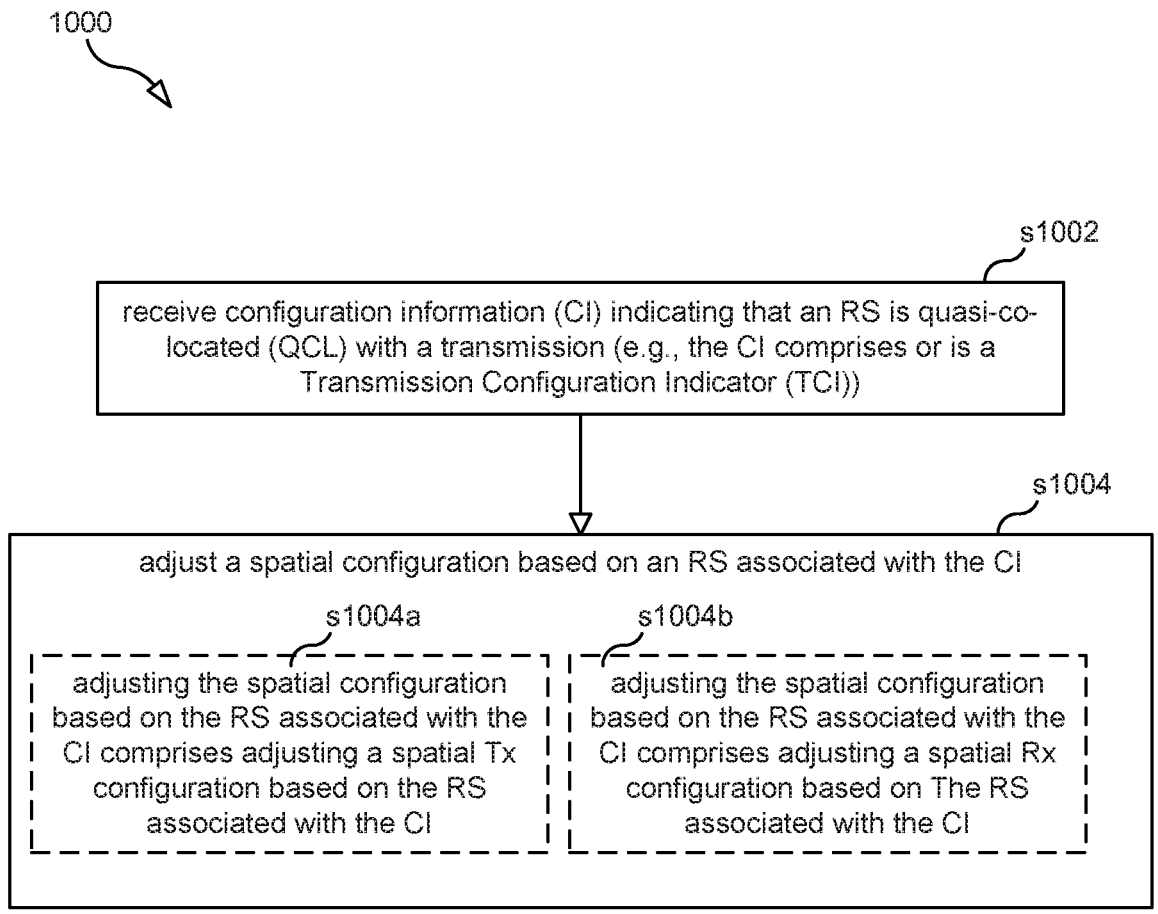
FIG. 10 is a flowchart illustrating a method implemented in a communication system including a host computer, a base station and a user equipment.

FIG. 10 depicts a process 1000 in accordance with particular embodiments. Process 1000 begins at step s1002 in which UE 110 receives a message comprising configuration information (CI) indicating that an RS is quasi-co-located (QCL) with a scheduled transmission (e.g., the CI comprises or is a Transmission Configuration Indicator (TCI)). The transmission may be a transmission of a channel (e.g., PUSCH, PUCCH, PDSCH, PDCCH) or reference signal. In step s1004, the UE adjusts a spatial configuration based on an RS associated with the received CI. Adjusting a spatial configuration based on the RS associated with the received CI may comprise: adjusting a spatial Tx configuration based on the RS associated with the received CI (step s1004a) and/or adjusting a spatial Rx configuration based on the RS associated with the received CI (step s1004b).

In some embodiments, the message is a layer 2 message, MAC-CE message, RRC message, or DCI message.

In some embodiments, the message is a DCI message and the DCI message comprises the CI and one of: an UL grant scheduling a PUSCH and a DL grant scheduling a PDSCH.

In some embodiments, the RS associated with the received CI is the RS indicated by the received CI.

In some embodiments, the RS associated with the received CI is one of a DL RS and an UL RS.

In some embodiments, one or more RS sets are associated with the CI, and the RS associated with the CI is in at least one of the RS sets associated with the CI.

In some embodiments, the CI comprises a Transmission Configuration Indicator, TCI, and the RS set(s) are associated with the TCI.

In some embodiments, the UE is configured to adjust the spatial Tx configuration such that the spatial configuration is reciprocal to a spatial configuration associated with the RS that is associated with the received CI.

In some embodiments, the RS associated with the received CI is a DL RS, and the UE is configured to adjust the spatial Tx configuration such that it is reciprocal to a spatial Rx configuration associated with the DL RS.

In some embodiments, the RS associated with the received CI is an UL RS included in an RS set associated with the CI, and the UE is configured to adjust the spatial Tx configuration such that it is reciprocal to a second spatial Tx configuration associated with the UL RS.

In some embodiments, the transmission is a PUSCH, PUCCH, or SRS transmission.

In some embodiments, the received CI is associated with i) a first RS set containing a first RS and ii) a second RS set containing a second RS, the UE adjusts a first spatial Tx configuration based on the first RS, the UE adjusts a second spatial Tx configuration based on the second RS, the UE uses the first spatial Tx configuration for transmission of PUCCH, and the UE uses the second spatial Tx configuration for transmission of PUSCH.

In some embodiments, the message is a DCI message and the received DCI further comprises a DL grant scheduling a PDSCH.

In some embodiments, the CI comprises a Transmission Configuration Indicator, TCI, and the RS sets are associated with the TCI.

In some embodiments, the RS associated with the CI is an UL RS included in an RS set associated with the CI, and the UE is configured to adjust the spatial Rx configuration such that the spatial Rx configuration is reciprocal to a spatial Tx configuration associated with the UL RS.

In some embodiments, the UE is configured to use the adjusted spatial Rx configuration to receive one or more of: PDCCH, PDSCH, SSB, TRS, PTRS, and CSI-RS.

In some embodiments, the transmission is a PDSCH or PDCCH transmission.

1. Spatial Tx configuration:
   a. in some embodiments, if the RS is a DL RS (e.g., CSI-RS, SSB), then the UE adjusts its spatial Tx configuration such that it is reciprocal to the Rx configuration used to receive the DL RS. "Reciprocal" can mean reciprocal spatial QCL between the first RS and the scheduled transmission which is PUSCH/PUCCH DMRS or SRS. Alternatively, it can simply mean that the Tx and Rx beam directions are reciprocal (pointing in opposite ways).
   b. in some embodiments, if the RS is an UL RS (e.g., SRS), then the UE adjusts its spatial Tx configuration such that it is aligned to the spatial Tx configuration used to transmit the UL RS. "Aligned" can mean spatial QCL between the first RS and the scheduled transmission which is PUSCH/PUCCH DMRS and SRS. Alternatively, it can simply mean that the two Tx directions are the same.

2. Spatial Rx Configuration
   a. in some embodiments, if the RS is an UL RS (e.g., SRS), then the UE adjusts its spatial Rx configuration such that it is reciprocal to the Tx configuration used to transmit the UL RS. "Reciprocal" can mean reciprocal spatial QCL between the first RS and the scheduled transmission, which in this case is PDSCH/PDCCH/CSI-RS/PTRS/TRS. Alternatively, it can simply mean that the Rx and Tx directions are reciprocal (pointing in opposite ways).

Figure 11:
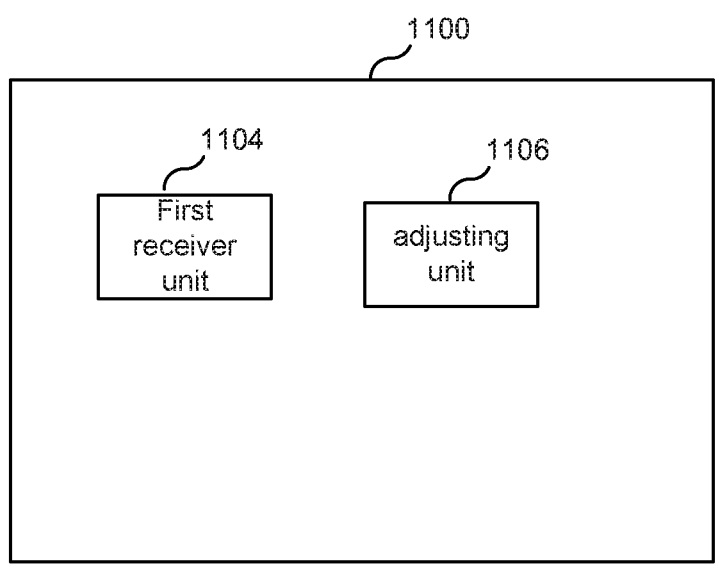
FIG. 11 illustrates a schematic block diagram of an apparatus 1100 in a wireless network.

FIG. 11 illustrates a schematic block diagram of an apparatus 1100 in a wireless network (for example, the wireless network shown in FIG. 1). The apparatus may be implemented in a wireless device (e.g., wireless device 110 shown in FIG. 1). Apparatus 1100 is operable to carry out the example method described with reference to FIG. 10 and possibly any other processes or methods disclosed herein. It is also to be understood that the method of FIG. 10 is not necessarily carried out solely by apparatus 1100. At least some operations of the method can be performed by one or more other entities.

Apparatus 1100 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause a first receiver unit 1104, the adjusting unit 1106, and any other suitable units of apparatus 1100 to perform corresponding functions according one or more embodiments of the present disclosure.

As illustrated in FIG. 11, apparatus 1100 includes first receiver unit 1104 and adjusting unit 1106. First receiver unit 1104 is configured to receive configuration information (CI) indicating that an RS is quasi-co-located (QCL) with a transmission (e.g., the CI comprises or is a Transmission Configuration Indicator (TCI)). The adjusting unit 1106 is configured to adjust a spatial configuration based on an RS associated with the received CI. Adjusting the spatial configuration based on the RS associated with the received CI may comprise: i) adjusting a spatial Tx configuration for the transmission of an UL signal (e.g., PUSCH, PUCCH, SRS) based on the RS associated with the received CI and/or ii) a adjusting spatial Rx configuration for the reception of a DL signal (e.g., PDCCH, PDSCH, SSB, TRS, PTRS, CSI-RS, DMRS) based on the RS associated with the received CI.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

EXAMPLE EMBODIMENTS

A. Group A Embodiments

A1. A method performed by a wireless device (WD) for beamforming, the method comprising:
receiving configuration information (CI) indicating that a reference signal (RS) is quasi-co-located (QCL) with a scheduled transmission (e.g., the CI comprises or is a Transmission Configuration Indicator (TCI));
adjusting a spatial configuration based on an RS associated with the received CI, wherein adjusting a spatial configuration based on the RS associated with received CI comprises one or more of: adjusting a spatial Tx configuration based on the RS associated with the received CI and adjusting a spatial Rx configuration based on the RS associated with the received CI.

A2. The method of embodiment A1, wherein receiving the CI comprises receiving one of: a scheduling message comprising the CI, a layer-2 message comprising the CI, a random access response message comprising the CI, Down Link Control Information (DCI) comprising the CI, a MAC-CE comprising the CI, and an RRC message comprising the CI.

A3. The method of embodiment A1 or A2, wherein the RS associated with the received CI is one of a DL RS and an UL RS, and adjusting a spatial configuration based on the RS associated with the received CI comprises adjusting a Tx configuration based on the RS associated with the received CI.

A4. The method of embodiment A3, wherein receiving the CI comprises receiving DCI comprising the CI and one of: an UL grant scheduling a PUSCH and a DL grant scheduling a PDSCH.

A5. The method of embodiment A3 or A4, wherein
one or more RS sets are associated with the CI, and
the RS associated with the CI is in at least one of the RS sets associated with the CI.

A6. The method of any one of embodiments A1-A5, wherein adjusting the spatial configuration comprises adjusting the spatial configuration such that the spatial configuration is reciprocal to a spatial configuration associated with the RS that is associated with the received CI.

A7. The method of embodiment A6, wherein
the RS associated with the received CI is a DL RS, and
adjusting the spatial configuration comprises adjusting a spatial Tx configuration such that the spatial Tx configuration is reciprocal to a spatial Rx configuration associated with the DL RS.

A8. The method of embodiment A6, wherein
the RS associated with the received CI is an UL RS included in an RS set associated with the CI, and
adjusting the spatial configuration comprises adjusting a spatial Tx configuration such that the spatial Tx configuration is reciprocal to a spatial Tx configuration associated with the UL RS.

A9. The method of embodiment A7 or A8, further comprising:
using the adjusted spatial Tx configuration to transmit one or more of: PUCCH, PUSCH, and SRS.

A10. The method of embodiment A6, wherein
the RS associated with the CI is an UL RS included in an RS set associated with the CI, and
adjusting the spatial configuration comprises adjusting a spatial Rx configuration such that the spatial Rx configuration is reciprocal to a spatial Tx configuration associated with the UL RS.

A11. The method of embodiment A7 or A8, further comprising:
using the adjusted spatial Rx configuration to receive one or more of: PDCCH, PDSCH, SSB, TRS, PTRS, and CSI-RS.

A12. The method of any one of embodiments A1-A11, wherein
the received CI is associated with i) a first RS set comprising a first RS and ii) a second RS set comprising a second RS,
the WD adjusts a first spatial Tx configuration based on the first RS,
the WD adjusts a second spatial Tx configuration based on the second RS,
the WD uses the first spatial Tx configuration for transmission of PUCCH, and
the WD uses the second spatial Tx configuration for transmission of PUSCH.

A13. The method of any of the previous embodiments, further comprising:
providing user data; and
forwarding the user data to a host computer via a transmission to the base station.

B. Group B Embodiments

B1. A WD, the WD comprising:
processing circuitry configured to perform any of the steps of any of the Group A embodiments; and
power supply circuitry configured to supply power to the wireless device.

B2. A WD, the WD comprising:
an antenna configured to send and receive wireless signals;
radio front-end circuitry connected to the antenna and to processing circuitry, and configured to condition signals communicated between the antenna and the processing circuitry;
the processing circuitry being configured to perform any of the steps of any of the Group A embodiments;
an input interface connected to the processing circuitry and configured to allow input of information into the WD to be processed by the processing circuitry;
an output interface connected to the processing circuitry and configured to output information from the WD that has been processed by the processing circuitry; and
a battery connected to the processing circuitry and configured to supply power to the WD.

B3. A communication system including a host computer comprising:
processing circuitry configured to provide user data; and
a communication interface configured to forward user data to a cellular network for transmission to a user equipment (UE), wherein
the UE comprises a radio interface and processing circuitry, the UE's components configured to perform any of the steps of any of the Group A embodiments.

B4. The communication system of embodiment B3, wherein the cellular network further includes a base station configured to communicate with the UE.

B5. The communication system embodiment B3 or B4, wherein:
the processing circuitry of the host computer is configured to execute a host application, thereby providing the user data; and
the UE's processing circuitry is configured to execute a client application associated with the host application.

B6. A method implemented in a communication system including a host computer, a base station and a user equipment (UE), the method comprising:
at the host computer, providing user data; and
at the host computer, initiating a transmission carrying the user data to the UE via a cellular network comprising the base station, wherein the UE performs any of the steps of any of the Group A embodiments.

B7. The method of the previous embodiment, further comprising at the UE, receiving the user data from the base station.

B8. A communication system including a host computer comprising:
communication interface configured to receive user data originating from a transmission from a user equipment (UE) to a base station, wherein
the UE comprises a radio interface and processing circuitry, the UE's processing circuitry configured to perform any of the steps of any of the Group A embodiments.

B9. The communication system of the previous embodiment, further including the UE.

B10. The communication system of the previous 2 embodiments, further including the base station, wherein the base station comprises a radio interface configured to communicate with the UE and a communication interface configured to forward to the host computer the user data carried by a transmission from the UE to the base station.

B11. The communication system of the previous 3 embodiments, wherein:
the processing circuitry of the host computer is configured to execute a host application; and
the UE's processing circuitry is configured to execute a client application associated with the host application, thereby providing the user data.

B12. The communication system of the previous 4 embodiments, wherein:
the processing circuitry of the host computer is configured to execute a host application, thereby providing request data; and
the UE's processing circuitry is configured to execute a client application associated with the host application, thereby providing the user data in response to the request data.

B13. A method implemented in a communication system including a host computer, a base station and a user equipment (UE), the method comprising:
at the host computer, receiving user data transmitted to the base station from the UE, wherein the UE performs any of the steps of any of the Group A embodiments.

B14. The method of the previous embodiment, further comprising, at the UE, providing the user data to the base station.

B15. The method of the previous 2 embodiments, further comprising:
at the UE, executing a client application, thereby providing the user data to be transmitted; and
at the host computer, executing a host application associated with the client application.

B16. The method of the previous 3 embodiments, further comprising:
at the UE, executing a client application; and
at the UE, receiving input data to the client application, the input data being provided at the host computer by executing a host application associated with the client application,
wherein the user data to be transmitted is provided by the client application in response to the input data.

B17. A method implemented in a communication system including a host computer, a base station and a user equipment (UE), the method comprising:
at the host computer, receiving, from the base station, user data originating from a transmission which the base station has received from the UE, wherein the UE performs any of the steps of any of the Group A embodiments.

B18. The method of the previous embodiment, further comprising at the base station, receiving the user data from the UE.

B19. The method of the previous 2 embodiments, further comprising at the base station, initiating a transmission of the received user data to the host computer.

The U.S. provisional patent application to which this application claims priority (i.e., U.S. application No. 62/556,940, filed on Sep. 11, 2017) included an appendix that contained the text of a 3GPP contribution. Some relevant aspects of the 3GPP contribution are reproduced here below:
Contribution 1. Introduction In this contribution remaining details for 3 topics related to beam management are discussed: 1) DL QCL (beam) indication for PDSCH and PDCCH; 2) UL beam indication; and 3) Beam measurement and reporting.

2. DL QCL Indication for PDSCH and PDCCH

In RAN1 #90 (Prague), agreement #1 (see Table 1, above) was made related to DL beam indication for PDSCH.

This agreement #1 establishes that an N-bit indicator field in DCI provides at least a spatial QCL reference to a DL RS (either CSI-RS or SSB) to aid in the demodulation of PDSCH. A given value of the indicator is referred to as an indicator state, and it is associated with an index of the DL RS (CRI or SSB Index). In the case of CSI-RS, the resource can be periodic, semi-persistent, or aperiodic. In this agreement, it is FFS how the DL RS index is associated with the indicator state, either through explicit signalling or implicitly during a UE measurement. This FFS point will be addressed later in this section.

In the same meeting, the N-bit indicator field was extended as shown in Agreement #2 (see Table 2, above)

With this extension, each indicator state is associated with one or two RS sets, where each RS set refers to one or two DMRS port groups, respectively. This facilitates QCL indication in the case of that multi-TRP transmission (DL CoMP) is configured. Different states may correspond to different TRP pairs supporting, e.g., non-coherent joint transmission (NC-JT) from a pair of TRPs. Indicator states configured with only a single RS set may be used to support QCL indication either in the case of basic single-TRP transmission or in the case of multi-TRP transmission with, e.g., dynamic point selection (DPS).

In any case, an RS set contains one or more DL RSs. In the case of a single DL RS, the set contains an index to either a CSI-RS or SSB. In the case of more than one DL RS, the set could contain, for example, an index to either CSI-RS or SSB and a configured TRS. As discussed in a companion paper on QCL details [1], the PDSCH DMRS could be configured to be QCL with CSI-RS/SSB with respect to spatial parameters, but QCL with TRS with respect to non-spatial (time/frequency) parameters. Further discussion on this type of configuration is needed once the TRS design details have settled.

Clearly, the functionality supported by the N-bit indicator is analogous to PQI in LTE which is used for the purposes of QCL and PDSCH rate matching indication in DCI format 2D supporting CoMP operation. One point of difference, however, is that for NR it is not clear that it is necessary to signal PDSCH rate matching parameters in the same way. Furthermore, the indicator is not limited to the case of multi-TRP (CoMP) operation. Dynamic (spatial) QCL indication is beneficial even for single TRP mmWave operation. Hence, this contribution proposes adopting a more general term for the N-bit indicator, namely Transmission Configuration Indicator (TCI) to capture the notion that the QCL configuration for a PDSCH transmission is indicated dynamically.

Table 3 (above) shows an exemplary set of TCI states that may be RRC configured to a UE. With N-bits, up to $2^N$ TCI states may be defined, some containing a single RS set and others containing multiple RS sets to support multi-TRP operation. In the case of basic single TRP operation, all TCI states would contain only a single RS set. A default TCI state is also shown which may be used, for example, for QCL indication referring to the SSB beam index determined by the UE during initial access. As discussed previously, different TCI states may be used for QCL indication referring to different RS types, i.e., SSB, periodic, semi-persistent, or aperiodic CSI-RS. It is up to the network implementation to configure the states depending on what mix of DL RSs are used for beam management.

2.1 Unified QCL indication for PDSCH and PDCCH

One of the FFS items in Agreement #1 above is regarding whether or not QCL indication for PDCCH may be based on the beam indication states for PDSCH. Contributors note that it makes very much sense to harmonize the QCL indication functionality for PDSCH and PDCCH as much as possible. The common thread for both PDSCH and PDCCH demodulation is that a QCL reference is needed in both cases. Furthermore, for mm-wave operation, the spatial QCL reference may need to be indicated dynamically to track UE movement/rotation. This motivates configuration of a common set of $2^N$ states where one subset may be used for the purposes of PDCCH QCL indication, and another, potentially overlapping subset of states used for PDSCH QCL indication. Examples of two such subsets are illustrated in Table 3.

Where there are differences between PDSCH and PDCCH QCL indication are: (1) The notion of DMRS port groups is relevant only for PDSCH; (2) A single set of DMRS ports as part of a configured CORESET is relevant only for PDCCH; (3) PDCCH may employ a wider beams than PDSCH; and (4) The signalling method used to convey the QCL indication to the UE may be different for PDSCH and PDCCH.

The first three points of difference may be addressed by network implementation with appropriate configuration of the TCI states. For example, point (1) is handled by the gNB ensuring that QCL indication for PDCCH is signalled only for TCI states that contain a single RS set. Point (2) is handled by the gNB semi-statically configuring potentially different CORESETs with the different TCI states used for PDCCH QCL indication. Point (3) may be handled by the gNB associating some TCI states with indices of DL RSs that are beamformed based on wider beams and some with narrower beams.

It is useful to note that a CORESET in NR takes the role of an E-PDCCH in LTE. Like for LTE, different CORESETs associated with different TCI states can allow for dynamic point switching of control channel transmissions in the case of multi-TRP operation. Even for single TRP operation, use of different CORESETs for different TCI states can allow for PDCCH robustness through the UE monitoring the different CORESETs transmitted on different beams either simultaneously or in TDM fashion.

Observation 1: A CORESET in NR takes the role of an E-PDCCH in LTE. Different CORESETs associated with different Transmission Configuration Indicator (TCI) states allows for dynamic beam switching of control channel transmissions either within a single TRP or between multiple TRPs.

Finally, point (4) is already addressed in existing agreements. Specifically, QCL indication for PDSCH is carried by DCI as discussed above. According to Agreement #3 shown in Table 4 below from RAN1 #90 (Prague), QCL indication for PDCCH is by RRC only or through a combination of RRC+MAC-CE signalling. While QCL indication by DCI is FFS in this agreement, there appears to be no fundamental reason why DCI cannot be used to carry QCL indication for PDCCH. In a companion contribution [2], the various signalling methods for beam indication are discussed and it is observed that a robust version of DCI-based signalling can provide similar reliability as MAC-CE signalling. Moreover, support for DCI-based QCL indication for PDSCH is already supported through signalling a TCI value, and could be reused quite easily.

TABLE 4

Agreement #3

In RRC CONNECTED mode,
    RRC only or RRC + MAC CE signaling is used to indicate QCL relation (at least w.r.t spatial RX parameters) between DMRS port(s) of UE-specific PDCCH and either SS Block or P/SP CSI-RS resource(s)
        FFS: necessity of DCI signalling
        FFS: Use of Aperiodic CSI-RS
    FFS: RANT to study impact of delay (including determination of Rx beam) and reliability on the beam mgmt scenarios aiming to provide input to RAN2 with regard to higher layer protocols Another FFS item in Agreement #3 is whether or not QCL indication for PDCCH may refer to an aperiodic CSI-RS resource. Since aperiodic CSI-RS resources are supported for PDSCH beam management procedures; from a network flexibility standpoint, there appears to be no fundamental reason why aperiodic CSI-RS resources should be precluded for PDCCH beam management. In some scenarios, a baseline beam management procedure may utilize the same beam for both PDSCH and PDCCH, and that this beam may be determined based on aperiodic measurements. Based on the above discussion this contribution makes the following short proposals:

Proposal 1: QCL indication for both PDSCH and PDCCH is based on either the same or different subsets of a common set of $2^N$ Transmission Configuration Indicator (TCI) states. The value of N is FFS, e.g., N=3.

Proposal 2: QCL indication for both PDSCH and PDCCH allow Transmission Configuration Indicator (TCI) states that refer to aperiodic CSI-RS resources.

Proposal 3: DCI-based QCL indication for PDCCH should be supported in addition to RRC only or RRC+MAC-CE.

This contribution additionally makes the following proposal shown in Table 5 below:

TABLE 5

Proposal 4: QCL indication for PDSCH and PDCCH

A list of up to $2^N$ Transmission Configuration Indication (TCI) states is defined for the UE at least for the purpose of QCL indication for PDSCH DMRS and PDCCH DMRS
    Each TCI state can have one or two RS sets, as per previous agreement
    FFS: Value of N, e.g., N = [8]
For PDSCH QCL indication:
    The UE is signalled the N-bit TCI field in DCI that selects one of the $2^N$ defined TCI states which provides a reference to one or two RS set(s) which are QCL with DMRS port(s) of the PDSCH scheduled to the UE, as per previous agreement
For PDCCH QCL indication:
    The UE is configured by RRC only or RRC + MAC CE signalling with a one of the $2^N$ defined TCI states which provides a reference to an RS set which is QCL with the DMRS port(s) of the PDCCH in a configured CORESET containing a UE specific search space
        FFS: Use of DCI signalling
        FFS: CORESET containing common search space
        Note: different CORESETs may be configured for different TCI states, e.g., for multi-TRP operation TABLE 5-continued Proposal 4: QCL indication for PDSCH and PDCCH Each RS set within a TCI state refers to one or more DL RS(s) which are QCL with the port(s) within a PDSCH DMRS port group or are QCL with the PDCCH DMRS port(s)
    A TCI state with two RS sets is only used in the case of two DMRS port groups for PDSCH
    A TCI state with one RS set is always used in the case of DMRS for PDCCH
An RS in an RS set can refer to any of the following DL RS types:
    SSB
    Periodic CSI-RS
    Aperiodic CSI-RS
    Semi-persistent CSI-RS
    FFS: TRS depending on outcome of discussions in the QCL agenda item
During initial access, the UE associates the TCI = 0 state with the SSB acquired during the initial access procedure

2.2 Procedures for defining/updating TCI states

The above discussion and proposals focus on the harmonization of QCL indication for both PDSCH and PDCCH through signalling of a Transmission Configuration Indicator (TCI) value. However, what is still open is the signalling mechanism for defining/updating the DL RS index (CSI-RS Resource Index or SSB index) associated with each RS set of a TCI state. This is needed in order to establish/update the spatial QCL reference in a TCI state before beam indication signalling is carried out based on signalling of a TCI state index.

Agreement #1 identifies two mechanisms FFS for updating a DL RS index in a RS set: (1) explicit signalling of the RS index, and (2) implicit association of the RS index(es) with the RS set based on UE measurement. Mechanism-1 (explicit update of a TCI state) is straight forward and should be supported. For example, a periodic beam sweep, either based on a large number of SSBs (up to 64 allowed for mm-wave) or a large number of periodic CSI-RS (p-CSI-RS) resources may be used during a P1 procedure. The UE may be configured to periodically report the N largest RSRPs and corresponding reference signal indices, e.g., CRIs, SSB indexes. The gNB decides what subset (or all) RS index(es) should be associated with which TCI state(s). The gNB then signals the TCI state index(es), the RS Set index(es), and the DL RS index(es) to the UE which updates its own TCI state configuration with the signalled RS index(es). This updates the spatial QCL reference that the UE should use for PDCCH/PDSCH demodulation when indicated in a future QCL indication message. This reference remains valid until the next time it is updated. Updates are required, e.g., to track UE movement/rotation. Clearly, the required update rate depends on how fast the UE is moving.

While the above process is described for p-CSI-RS resources, the same procedure may be used to initialize the spatial QCL reference for a TCI state that will be updated at a later time with a QCL reference to an aperiodic CSI-RS resource. This is useful, for example, when a periodic DL RS, e.g., SSB or p-CSI-RS, is used for new beam discovery and aperiodic CSI-RS is used for beam refinement, either through a P2 or P3 procedure. When a new beam is discovered by the gNB based on UE reporting, the gNB explicitly signals a TCI state index and the RS index corresponding to the new beam to the UE. The UE then updates its own TCI state configuration with the signalled RS index. For the case of a P2 beam refinement, the initialized QCL reference to the periodic resource is useful for the UE to help it set its Rx beam for receiving the aperiodic CSI-RS resources during the P2 refinement step.

Mechanism-2 (implicit update of a TCI state) is useful for aperiodically triggered P2 or P3 refinement procedures and should also be supported. In Mechanism-2, the UE is triggered to perform a measurement on a set or sets of aperiodic CSI-RS resources for the purposes of beam management either on the Tx side or Rx side. The UE receives by DCI the measurement trigger plus a TCI state index. In the example above, the TCI state can be the same one that was initialized explicitly. When the UE receives the TCI state index along with the measurement trigger, the UE shall interpret this as instruction to perform the measurement, and replace the RS index in each RS set with the preferred CRI from each resource set on which it measures, respectively. These RS index(es) then become the new QCL references for the signalled TCI state and remain valid until the next time a measurement trigger with the same TCI index is received.

Based on the above discussion this contribution makes the following short proposal: Proposal 4: Mechanism-1 (explicit update of the RS index(es) of a TCI state) is supported for SSB and p/sp/ap-CSI-RS resources. Mechanism-2 (implicit update of the RS index(es) of a TCI state) is supported for ap-CSI-RS resources. For Mechanism-2, the UE can expect to receive in DCI a measurement trigger for the ap-CSI-RS resources plus a TCI state index.

This contribution additionally makes the following more comprehensive proposal shown in Table 6 below:

TABLE 6

Proposal for Procedures for defining/updating TCI States

For a UE in RRC CONNECTED mode, an RS within an RS set of any TCI state may be dynamically updated through either of the following two mechanisms
Mechanism-1 (Explicit update of a TCI state)
    The UE receives a signalling message with a TCI value and TABLE 6-continued Proposal for Procedures for defining/updating TCI States the index of a DL RS to be assigned to an RS set belonging
to the TCI state
The RS index can be an
    SSB index
    Index of a periodic, semi-persistent, or aperiodic CSI-RS
    resource
        If measurement restriction is ON (for periodic/semi-
        persistent CSI-RS) the index refers to the most recent
        measurement of the indicated resource
        For aperiodic CSI-RS, the index refers to the most recent
        measurement of the indicated resource
        FFS: Additionally support a time-stamped measurement
        of a CSI-RS resource
If the UE receives the signalling message in slot n, the
first time that the UE may apply the updated QCL assumption
for demodulation of PDSCH or PDCCH is in slot n + $d_1$
    FFS: Value of $d_1$
Note: The signalling can simultaneously update two RS sets in which
case two RS indexes would be signalled. Furthermore, the signalling
can simultaneously update more than one TCI state.
FFS: Further signalling details, e.g., RRC, MAC-CE, DCI, or a
combination
Mechanism-2 (Implicit update of a TCI state)
    The UE receives by DCI a measurement trigger for one or two
    resource sets of aperiodic CSI-RS resources in the same slot,
    plus a TCI value
        Note: a resource set in this context refers to a set of CSI-RS
        resources configured within a resource setting in the agreed
        CSI framework
    The UE implicitly associates the preferred CSI-RS resource from each
    triggered resource set with the TCI state of the signalled TCI value
    and thus assigns the preferred CSI-RS(s) to the RS set(s) within the
    TCI state
    If the UE receives the DCI measurement trigger in slot n, the first
    time that the UE may apply the updated QCL assumption for
    demodulation of PDSCH or PDCCH is in slot n + $d_2$
        FFS: Value of $d_2$
    FFS: Further signalling details, e.g., joint or separate encoding
    of the measurement trigger and TCI value in DCI

2.2 Single-beam operation

Much of the procedures on beam indication have been designed under the assumption that the PDCCH and PDSCH beams are separately updated. The indication schemes have been designed under the assumption that the UE should adjust its Rx beams differently for PDCCH and PDSCH reception.

However, in many cases, this level of freedom is unnecessary. Both the PDCCH and PDSCH should be transmitted with beams that provide the best SINR at the receiver. In many cases, this is the narrowest beam. Then, the target BLER for the PDCCH and the PDSCH are likely to be different, and that will be achieved by suitable selection of the PDCCH format and the PDSCH scheduling mechanism.

Observation: A very common realization is that the PDCCH and PDSCH are transmitted using the same beam.

Furthermore, the implementation of independent PDCCH and PDSCH beams leads to increased signalling. The extra amount depends on how often then the PDCCH and PDSCH beams are updated.

In addition, introducing the possibility to switch between the PDCCH and the PDSCH leads to a more complex UE implementation than if the Rx beam switches are constrained to be between slots. For these reasons, this contribution proposes: NR should support a configuration that beam indications for PDSCH are valid also for PDCCH.

3. UL Beam Indication

In the previous section, DL beam indication is discussed both for PDSCH and PDCCH. DL beam indication consists of signalling a TCI to the UE which provides one or more spatial QCL references which can be used by the UE to adjust its Rx spatial configuration, i.e., spatial filter/spatial precoder/beam for the purposes of demodulation of PDSCH and PDCCH. Maintenance of several different TCI states allows flexibility to the gNB to dynamically switch between different Tx beams either within a TRP or between TRPs. This is beneficial, e.g., for MU-MIMO operation by being able to schedule different users in different candidate beams, and multi-TRP operation to support either or both dynamic point selection (DPS) or non-coherent joint transmission (NC-JT).

While DL beam indication has been discussed extensively, UL beam indication has not received very much attention. Clearly, if DL beam indication is used, some form of beam indication in the uplink is beneficial to aid the UE in adjusting its Tx spatial configuration, i.e., spatial filter/spatial precoder/beam for the purposes of transmitting UL signals (PUSCH, PUCCH, and SRS). This simplifies gNB operation in the demodulation of PUSCH and PUCCH in that the received signals at the gNB are aligned with a desired gNB analog beam direction.

Since a framework for DL beam indication has already been agreed, it makes sense to leverage that framework as much as possible for UL beam indication. In order to enable the UE adjustment of its Tx spatial configuration for the transmission of PUSCH/PUCCH/SRS, a spatial QCL reference is needed. In the case of UEs with UL/DL beam correspondence, a natural candidate is the DL RS (CSI-RS or SSB) that is associated with the TCI that is signalled in DCI for the purposes of DL beam indication. This may be used by the UE to adjust its spatial Tx configuration such that it is reciprocal to the spatial Rx configuration with the DL RS. Here reciprocal can mean that a UE Tx beam is oriented in the same direction of an Rx beam. It could also mean that ports of the transmitted uplink reference signal (PUSCH/PUCCH DMRS or SRS) are reciprocally and spatially quasi-co-located with the ports of the DL RS. However, the notation of reciprocal QCL has not been agreed in RAN1. Regardless, the notion of reciprocal beam directions is quite natural.

In the case of DL beam indication to aid in the reception of PDSCH, it has been agreed that the scheduling DCI contains the TCI field. In other words, the TCI is part of a DL assignment or DL grant. For the case of UL beam indication, it makes sense to extend this framework such that the TCI field is included in the DCI that schedules PUSCH as well. In other words, the TCI may also be part of an UL grant. This can be useful in UL heavy traffic scenarios, where there could be a long time between DCI containing DL assignments.

In the above discussion, the UE makes use of a DL RS (CSI-RS, SSB) as the spatial QCL reference to adjust its spatial Tx configuration. However, there are at least two use cases where it is beneficial for the UE to make use of an UL RS (e.g., SRS) as the spatial QCL reference: (1) UL beam indication for UEs lacking UL/DL beam correspondence, and (2) DL beam indication for reciprocity based operation. To support these use cases, it makes sense to extend the beam indication framework such that UL RSs can also be associated with TCI states, e.g., as another type of RS to be included in the RS Set of a TCI state. The particular SRS that is associated with the TCI state can be based on a prior measurement at the gNB on a set of SRS resources transmitted by the UE, e.g., in a U3 procedure. Based on this measurement, the gNB explicitly signals the UE with an SRS resource indicator (SRI) indicating the preferred SRS resource along with the TCI to which the UE should associated the indicated SRI. In this way, when TCI is signalled in DCI at a later point in time for the purposes of either DL or UL beam indication, the associated UL RS provides the UE with the needed spatial QCL reference.

For use case (1), the UE adjusts its spatial Tx configuration such that it aligns with the spatial Tx configuration associated with the UL RS (SRS) contained in the TCI state signalled over DCI in an UL grant. In this way, the gNB can control the receive direction for PUSCH/PUSCH/SRS for UEs lacking UL/DL beam correspondence. For use case (2), the UE adjusts its spatial Rx configuration such that it is reciprocal to the spatial Tx configuration associated with the UL RS (SRS) contained in the TCI state signalled over DCI in a DL grant. In this way, the gNB can base its DL beamforming decisions for transmission of PDSCH/PDCCH/CSI-RS/PTRS/TRS, based on reciprocity (SRS) measurements, while simultaneously providing the UE with the needed spatial QCL reference for adjusting its spatial Rx configuration.

Based on the above discussion, the following is proposed:

Proposal 5: To enable UL beam indication, NR supports signalling a TCI in a DCI message containing an UL grant to aid the UE in adjusting its spatial Tx configuration (beam) for the purposes of transmitting PUSCH/PUCCH/SRS.

Proposal 6: To enable either (1) DL beam indication for reciprocity operation or (2) UL beam indication for UEs lacking UL/DL beam correspondence, NR supports inclusion of an SRS resource in an RS Set associated with a TCI state to provide the UE with a spatial QCL reference for adjusting its spatial Rx/Tx configuration (beam).

4. Beam Measurement and Reporting

4.1 Measurement and Reporting on SSB

In RAN1 #90 (Prague), the following agreement #4 was made regarding L1-RSRP measurements based on SSB and configuration of CSI-RS resources for beam management.

TABLE 7

| Agreement #4 |
| --- |
| Support L1-RSRP reporting of measurements on SS block for beam management procedures<br>The following configurations for L1-RSRP reporting for beam management are supported<br>    SS block only (with mandatory support by UE)<br>    CSI-RS only (with mandatory support by UE)<br>    SS block + CSI-RS independent L1 RSRP reporting<br>        Joint L1-RSRP using QCL-ed SS-block + CSI-RS is optionally<br>        supported by UE (with optionally support by UE)<br>Working assumption:<br>    For beam management CSI-RS, NR supports higher layer configuration<br>    of a set of single-symbol CSI-RS resources where<br>    The set configuration contains an information element (IE)<br>    indicating whether repetition is "on/off"<br>Note: In this context, repetition "on/off" means:<br>    "On": The UE may assume that the gNB maintains a fixed<br>    Tx beam<br>    "Off": The UE can not assume that the gNB maintains a<br>    fixed Tx beam<br>Note: This does NOT necessarily mean that the CSI-RS resources<br>in a set occupy adjacent symbols |

Here the $3^{rd}$ approach listed in the first agreement: SS block+CSI-RS with independent L1 RSRP reporting is considered. Extending the CSI and beam management framework to include resource and report settings that are based on SSB in an analogous fashion to settings that are based on CSI-RS seems suitable.

A use case in which SSB is used for the purposes identifying new beams as they appear due to UE movement and/or rotation is considered. Since the SSB beams typically sweep most of the coverage area of a TRP, use of the SS blocks for beam management can relieve some of the burden on configuration of UE-specific CSI-RS. Here, CSI-RS used in an aperiodic fashion to refine coarse beams identified through SS block measurements, thus avoiding configuring CSI-RS to sweep the entire coverage area, is considered.

Figure 12:
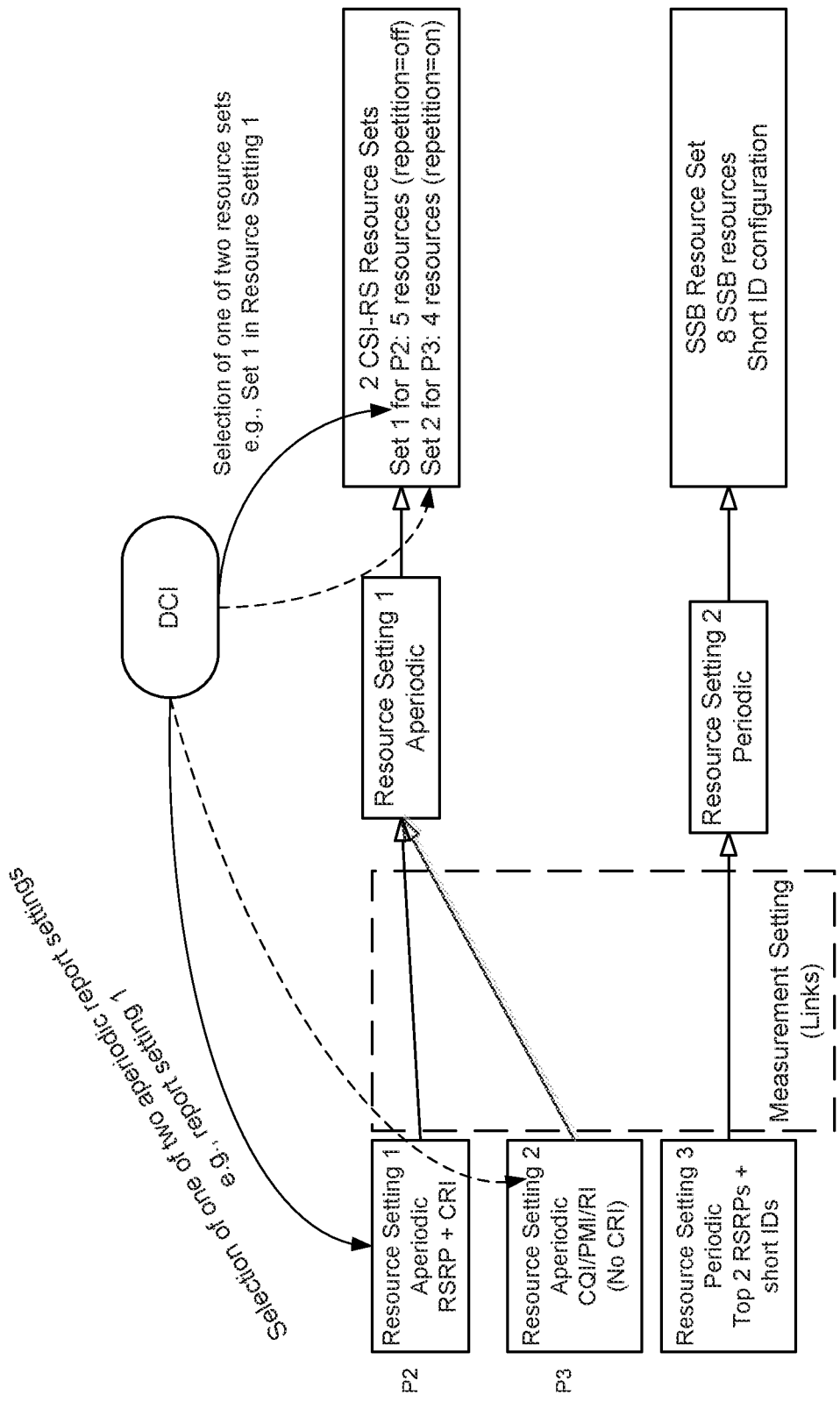
FIG. 12 illustrates a beam management framework according to an embodiments.

FIG. 12 shows a configuration example to support this use case. In this diagram there are two aperiodic report settings linked to a resource setting containing two sets of aperiodic CSI-RS resources used for the purposes of beam refinement. One set is configured with the repetition IE set to OFF (see above working assumption), and the other with repetition set to ON. DCI jointly selects the Report Setting 1+Set 1 when a P2 procedure (gNB Tx beam sweep) is triggered, and jointly selects Report Setting 2+Set 2 when a P3 procedure (UE Rx beam sweep) is triggered.

In addition, the FIG. 12 diagram shows Resource Setting 2 which contains a set of periodic SSB resources. This is linked to Report Setting 3 which in this example is configured as periodic. Similar configurations may be constructed in a straight forward manner for the case of semi-persistent or aperiodic reporting on SSB. In this example, the UE is configured to report the top two SSBs and corresponding SSB indexes on a periodic basis, e.g., once per 20 ms.

A consideration in configuring L1-RSRP reporting based on SSB is the uplink signalling overhead (UCI). In order to uniquely identify an SS block from an arbitrary unknown TRP, a fairly large number of bits could be required. The PSS and SSS together uniquely identify a cell ID, and it has been agreed to support in the order of 1000 cell IDs (approximately double that of LTE). Hence this requires on the order of 10 bits. Up to 64 SS blocks can be configured in an SS burst set, meaning up to additional 6 bits are required to identify the SS block time index. This results in 16 bits, and if one accounts for an additional 7 bits to represent an RSRP value, a minimum of 23 bits are required to signal an SS beam index and a corresponding RSRP measurement. This is a fairly large value considering what payload sizes are being considered for PUCCH. Even if reporting is restricted to within cell, 6 bits will be required to identify the SS beam index. Note that the UL signalling must be dimensioned to handle the situation where all 64 SSB are transmitted, although a much smaller number of SSBs will typically be used.

One approach for overhead reduction is to configure the UE using RRC with a table containing a mapping between full SS block identities and short measurement identities. The full SS block identity would include the ~10 bits representing the PSS/SSS identity and the up to 6 bits representing the SS block time index, whereas the short measurement identity would be 6 bits or less, depending on how many SSBs are configured. The short identity would be the one used in the measurement report. By using a short identity in this way, it would also be possible to perform measurements on a preconfigured subset of the available SS block beams, rather than the full set. This approach is similar to the CSI framework, where the UE is configured with one or more sets of CSI-RS resources via RRC. Each CSI-RS resource within a set is then identified by a short identifier, the CRI.

Such an approach is shown in FIG. 12 in which the UE is configured to measure on a set of 8 SSB resources, and the set configuration within Resource Setting 2 contains an IE specifying the short ID configuration, i.e., mapping between long and short IDs. In this case, since only 8 SSB resources are configured, the short ID is only 3 bits. Using the example of 7 bits per RSRP value, the total overhead per reporting instance in this example would be 2*7+2*3=20 bits. If the RSRP resolution is reduced and/or if differential RSRP reporting is used, this may be reduced further.

Based on the above discussion the following is proposed:

Proposal 7: Extend the CSI/Beam Management framework to enable configuration of a set of SSB resources within a resource setting on which the UE shall perform L1-RSRP measurements. The set of SSB resources may be all or a subset of transmitted SSBs from a TRP. Extend the framework to enable configuration of a report setting linked to the aforementioned resource setting. The report setting contains at least the following parameters: time domain behaviour=[periodic, semi-persistent, aperiodic], and N=the number of reported RSRPs. Maximum value of N is FFS.

Proposal 8: For L1-RSRP reporting on SSB, support configuring the UE with a mapping between the full SS block identity and a short measurement identity (6 or fewer bits). The short measurement identity is used in measurement reports and uniquely identifies a SSB resource within a configured set of SSB resources. An IE specifying the short ID configuration is associated with the configured set of SSB resources within a resource setting.

4.2 Measurement and Reporting Parameters

In RAN1 #90 (Prague), the following agreement #5 was made regarding parameters for measurement and reporting:

TABLE 8

Agreement #5

At least for non-grouping based beam reporting, taking the following parameter values for further consideration
    For maximal TX beam numbers for a UE to measure for a given reporting instance: candidate value is, e.g., around K = [64]
    For maximal TX beam numbers reported by a UE per reporting instance are, e.g., N = [1, 2, 4, 8]
    For L1-RSRP levels, candidate value is, e.g., around [100]
        Considering maximal L1-RSRP range, e.g., from X dBm to Y dBm
        Considering step-size of L1-RSRP, e.g., Z dB
. . .

In the above agreement, the maximum number of beams on which a UE is expected to measure in advance of reporting is [64]. This number corresponds to the maximum number of SSBs in one cell, so in this context this seems reasonable, since the UE will be able to hear all the transmitted SS blocks during one SS burst set. However, it is important to note that for aperiodic CSI-RS measurements which are often used for refinement purposes, the number is significantly less, perhaps less than 10. Also note that if the SSB measurement and reporting scheme proposed in section 0 is adopted, the UE would only be required to measure on the SS blocks actually configured. The maximum number of reported resource indices (beams) is stated above as N=[1, 2,4,8]. Considering uplink overhead, it would be very natural to support 1 or 2 as a starting point, and perhaps up to 4. However, 8 seems questionable. It is not clear what the gNB should do with such a large report. In a MU-MIMO context, having flexibility to schedule users in different beams is useful; however, considering typical traffic models, how often can 8 users be found that are suitable for co-scheduling? Also note that for analog beamforming, hardware typically limits the co-scheduling possibilities. Moreover, specifying that the UE always reports N values may not be desirable in case that some values are quite low compared to the maximum reported value.

For L1-RSRP levels, a number that is often quoted is 7 bits, corresponding to 128 levels. This number comes from L3-RSRP reporting for RRM purposes. RAN4 is still evaluating the RSRP accuracy requirements for beam management based on CSI-RS considering different density values, so it is too early to decide on a suitable value. However, one observation is that differential reporting can lower the overhead. For example, if N RSRPs are reported, the largest one can be quantized, e.g., with 7 bits, and the differential values with a smaller number of bits.

5. References

[1] R1-1716376, "Remaining details on QCL," Ericsson, RAN1 NR Ad Hoc #3, September 2017.
[2] R1-1716367, "Analysis of beam indication signalling options," Ericsson, RAN1 NR Ad Hoc #3, September 2017.

Abbreviations

At least some of the following abbreviations may be used in this disclosure. If there is an inconsistency between abbreviations, preference should be given to how it is used above. If listed multiple times below, the first listing should be preferred over any subsequent listing(s).

CSI-RS Channel state information reference signal
DCI Downlink control information
DL Downlink
DMRS Demodulation RS
MAC-CE MAC Control Element
NR New Radio
PBCH Physical broadcast channel
PDCCH Physical Downlink control channel
PDSCH Physical downlink shared data channel
PSS Primary Synchronization Signal
PTRS Phase Tracking RS
PUCCH Physical Uplink control channel
PUSCH Physical uplink shared data channel
QRI QCL Reference Indicator
RS Reference Signal
Rx Receiver radio chain
SRS Sounding Reference Signal
SSB Synchronization signal block
SSS Secondary Synchronization Signal
TCI Transmission Configuration Indicator
TRP Transmission Point
TRS Tracking RS
Tx Transmission radio chain
UE User Equipment
UL Uplink

The invention claimed is:

1. A user equipment (UE), the UE comprising:
a transmitter for performing uplink (UL) transmissions; and
a receiver for receiving a message comprising configuration information (CI) indicating that a reference signal (RS) is quasi-co-located (QCL) with an UL transmission, wherein the UE is configured to:
determine a spatial transmit (Tx) configuration for the UL transmission based on the RS associated with the received CI, where the RS is a downlink (DL) RS or an uplink (UL) RS, and
use the determined spatial Tx configuration to perform the UL transmission, wherein
if the RS is the DL RS, then the UE determines the spatial Tx configuration based on a spatial receive (Rx) configuration that was used to receive the DL RS, otherwise, the RS is the UL RS, and the UE determines the spatial Tx configuration based on a spatial Tx configuration that was used to transmit the UL RS.

2. The UE of claim 1, wherein the message is a layer 2 message comprising the CI.
3. The UE of claim 1, wherein the message is a Medium Access Control Control Element (MAC-CE) comprising the CI.
4. The UE of claim 1, wherein the message is a Radio Resource Control (RRC) message comprising the CI.
5. The UE of claim 1, wherein the message is a Downlink Control Information (DCI) message comprising the CI.
6. The UE of claim 5, wherein
the DCI message comprises the CI, and
the DCI message further comprises an UL grant scheduling a Physical Uplink Shared Channel (PUSCH).
7. The UE of claim 1, wherein
one or more RS sets are associated with the CI, and
the RS associated with the CI is in at least one of the RS sets associated with the CI.
8. The UE of claim 7, wherein
the CI comprises a Transmission Configuration Indicator (TCI) and
the RS set(s) are associated with the TCI.
9. The UE of claim 1, wherein the UE is configured to adjust the spatial Tx configuration such that the spatial configuration is reciprocal to a spatial configuration associated with the RS that is associated with the received CI.
10. The UE of claim 9, wherein
the RS associated with the received CI is a downlink (DL) RS, and
the UE is configured to determine the spatial Tx configuration such that it is reciprocal to a spatial Rx configuration associated with the DL RS.
11. The UE of claim 9, wherein
the RS associated with the received CI is an UL RS included in an RS set associated with the CI, and
the UE is configured to determine the spatial Tx configuration such that it is reciprocal to a second spatial Tx configuration associated with the UL RS.
12. The UE of claim 1, wherein the transmission is a SRS transmission.
13. The UE of claim 1, wherein the received CI is associated with i) a first RS set containing a first RS and ii) a second RS set containing a second RS, the UE adjusts a first spatial Tx configuration based on the first RS, the UE adjusts a second spatial Tx configuration based on the second RS, the UE uses the first spatial Tx configuration for transmission of PUCCH, and the UE uses the second spatial Tx configuration for transmission of PUSCH.
14. A method performed by a user equipment (UE), the method comprising:
receiving a message comprising configuration information (CI) indicating that a reference signal (RS) is quasi-co-located (QCL) with an uplink (UL) transmission;
determining a spatial transmit (Tx) configuration for the UL transmission based on the RS associated with the received CI, where the RS is a downlink (DL) RS or an uplink (UL) RS; and
using the determined spatial Tx configuration to perform the UL transmission, wherein
if the RS is the DL RS, then the UE determines the spatial Tx configuration based on a spatial receive (Rx) configuration that was used to receive the DL RS, otherwise, the RS is the UL RS, and the UE determines the spatial Tx configuration based on a spatial Tx configuration that was used to transmit the UL RS.
15. A computer program product comprising a non-transitory computer readable medium storing a computer program comprising instructions which, when executed on at least one processor, cause the at least one processor to carry out the method of claim 14.

\* \* \* \* \*